(12) United States Patent
Van Mill et al.

(10) Patent No.: US 12,717,327 B2
(45) Date of Patent: Aug. 25, 2026

(54) AUTOMATED CART OPERATION

(71) Applicant: Unverferth Manufacturing Company, Inc., Kalida, OH (US)

(72) Inventors: Michael D. Van Mill, Shell Rock, IA (US); Christopher M. Self, Aplington, IA (US); Ronald J. Schlimgen, Shell Rock, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 18/325,584

(22) Filed: May 30, 2023

(65) Prior Publication Data

US 2023/0341860 A1 Oct. 26, 2023

Related U.S. Application Data

(63) Continuation of application No. 16/998,799, filed on Aug. 20, 2020.

(60) Provisional application No. 62/990,547, filed on Mar. 17, 2020.

(51) Int. Cl.

| | |
|---|---|
| ***G01C 21/00*** | (2006.01) |
| ***A01D 90/00*** | (2006.01) |
| ***A01D 90/10*** | (2006.01) |
| ***G01C 21/34*** | (2006.01) |
| ***G01S 19/00*** | (2010.01) |

(Continued)

(52) U.S. Cl.
CPC ........... *G05D 1/0214* (2013.01); *A01D 90/10* (2013.01); *G01C 21/3407* (2013.01); *G01S 19/42* (2013.01)

(58) Field of Classification Search
CPC .......................... G05D 1/0214; G01C 21/3407
See application file for complete search history.

(56) References Cited

U.S. PATENT DOCUMENTS

| | | | |
|---|---|---|---|
| 5,675,056 | A | 10/1997 | Vance |
| 7,205,490 | B2 | 4/2007 | Van Mill et al. |
| 8,414,246 | B2 | 4/2013 | Tobey |

(Continued)

FOREIGN PATENT DOCUMENTS

| | | | |
|---|---|---|---|
| AU | 2012205196 | A1 | 2/2013 |
| CA | 2746718 | A1 | 2/2012 |

(Continued)

OTHER PUBLICATIONS

John Deere Machine Sync, "Operator's Manual John Deere Machine Sync", OMPFP12757 Issue L2, 52 pages.

*Primary Examiner* — Aaron G Cain
(74) *Attorney, Agent, or Firm* — ROTHWELL, FIGG, ERNST & MANBECK, P.C.

(57) ABSTRACT

Systems and methods for automated cart operation. The automated cart operation may include determining whether a container is full at a first unloading location and, if so, moving the cart from the first unloading location to a second unloading location. The automated cart operation may include moving the cart to a container, determining whether the cart is near the container, and, if the cart is determined to be near the container, stopping the cart. The automated cart operation may include determining a route from a current location to the location of a farm implement that avoids one or more permanent obstacles and areas of the field that have not been harvested and moving the cart to the farm implement on the determined route.

22 Claims, 11 Drawing Sheets

(51) Int. Cl.
*G05D 1/00* (2024.01)
*G01S 19/42* (2010.01)

(56) References Cited

U.S. PATENT DOCUMENTS 8,544,574 B2 10/2013 Fegley et al.
8,649,940 B2 2/2014 Bonefas
9,119,342 B2 9/2015 Bonefas
9,185,845 B2 11/2015 Van Mill et al.
9,187,259 B2 11/2015 Van Mill et al.
9,272,853 B2 3/2016 Van Mill et al.
9,596,805 B2 3/2017 Van Mill et al.
9,596,809 B2 3/2017 Van Mill et al.
9,763,389 B2 9/2017 Bump et al.
9,873,570 B2 1/2018 Van Mill et al.
9,891,629 B2 2/2018 Murray et al.
10,028,434 B2 7/2018 Van Mill et al.
10,028,441 B2 7/2018 Van Mill et al.
10,028,442 B1 7/2018 Crosby
10,080,321 B2 9/2018 Blackwell et al.
10,104,824 B2 10/2018 Blackwell et al.
10,111,373 B2 10/2018 Blackwell et al.
10,130,022 B2 11/2018 Blackwell et al.
10,377,290 B2 8/2019 Stilborn et al.
10,412,893 B2 9/2019 Missotten et al.
10,485,177 B2 11/2019 Bump et al.
10,565,555 B1 2/2020 Kim et al.
11,008,177 B2 5/2021 Banthia et al.
2006/0151217 A1 7/2006 Mill et al.
2010/0314221 A1 12/2010 Garberson et al.
2012/0087771 A1 4/2012 Wenzel
2012/0215381 A1* 8/2012 Wang .................. A01B 69/008 701/1
2013/0020138 A1 1/2013 Fegley et al.
2013/0045067 A1 2/2013 Pickett et al.
2014/0197010 A1 7/2014 Garberson et al.
2014/0277963 A1 9/2014 Van Mill et al.
2014/0284118 A1 9/2014 Van Mill et al.
2014/0286731 A1 9/2014 Van Mill et al.
2014/0288789 A1 9/2014 Van Mill et al.
2014/0311113 A1* 10/2014 Bonefas ............... A01D 34/008 56/10.2 R
2014/0365170 A1 12/2014 Van Mill et al.
2014/0379122 A1 12/2014 Gerdeman et al.
2015/0023767 A1 1/2015 Affleck
2015/0032252 A1 1/2015 Galluzzo et al.
2015/0101519 A1 4/2015 Blackwell et al.
2015/0105962 A1 4/2015 Blackwell et al.
2015/0105963 A1 4/2015 Blackwell et al.
2015/0105965 A1 4/2015 Blackwell et al.
2015/0203019 A1 7/2015 Kinzenbaw
2015/0204713 A1 7/2015 Schlimgen et al.
2016/0066512 A1* 3/2016 Van Mill ................ B65G 43/00 701/50
2016/0135368 A1 5/2016 Van Mill et al.
2016/0251167 A1 9/2016 Van Mill et al.
2016/0261698 A1 9/2016 Thompson et al.
2017/0055455 A1 3/2017 Missotten et al.
2017/0142902 A1 5/2017 Van Mill et al.
2017/0150679 A1 6/2017 Van Mill et al.
2017/0192419 A1* 7/2017 Ray ...................... G05D 1/0291
2017/0227969 A1 8/2017 Murray et al.
2017/0357400 A1 12/2017 Foster et al.
2017/0368691 A1 12/2017 Li
2018/0317386 A1 11/2018 Van Mill et al.
2018/0321683 A1 11/2018 Foster et al.
2018/0325009 A1 11/2018 Blackwell et al.
2018/0359906 A1* 12/2018 Foster .................. A01B 69/008
2019/0141899 A1 5/2019 Winsnes et al.
2019/0200510 A1 7/2019 Chrysanthakopoulos et al.
2019/0322461 A1* 10/2019 Banthia ..................... B60P 1/56
2019/0325534 A1 10/2019 Perry et al.
2019/0364734 A1 12/2019 Kriebel et al.
2020/0196526 A1 6/2020 Koch et al.
2020/0215955 A1 7/2020 Aljallis et al.

FOREIGN PATENT DOCUMENTS

CA 2847059 A1 9/2014
CA 2847062 A1 9/2014
CA 2847068 A1 9/2014
CA 2847070 A1 9/2014
CA 2862456 A1 2/2016
EP 2548429 A1 1/2013
EP 3057398 A1 8/2016
EP 3469436 A1 4/2019
WO 2015/057630 A1 4/2015
WO 2015/057633 A1 4/2015
WO 2015/057637 A1 4/2015
WO 2015/057638 A1 4/2015
WO 2017/205403 A1 11/2017
WO 2017/205410 A1 11/2017
WO 2017/214551 A1 12/2017

* cited by examiner 100
104
102
106
108
110
112
114
120

AUTOMATED CART OPERATION

CROSS-REFERENCE TO RELATED APPLICATION

The present application is a continuation of U.S. patent application Ser. No. 16/998,799, filed on Aug. 20, 2020, which claims the benefit of priority to U.S. Provisional Application Ser. No. 62/990,547, filed on Mar. 17, 2020, which are incorporated herein by reference in their entireties.

BACKGROUND

Field of Invention

The present invention relates to automated operation of a cart configured to receive grain from a harvester and unload the grain into a container. More particularly, aspects of the present invention relate to automated cart loading, travel to a container, unloading, and/or travel to a harvester.

Discussion of the Background

Carts shorten harvesting time by improving the efficiency of harvesting equipment such as combine harvesters. Carts transport grain from harvesting equipment in the field to grain trucks or bins at the side of the field. Carts are needed because grain bins are immobile, and grain trucks often do not perform well in muddy or rough field conditions and have the potential to spark fires in dry fields. Carts usually comprise a grain bin (i.e., hopper or box) sitting atop a wheeled frame in combination with an auger means or mechanism for unloading grain from the hopper. Carts handle soft or rough fields with ease and are typically drawn by a tractor alongside a harvester combine, which unloads its contents into the cart. Carts enable a combine to continue harvesting grain while unloading grain into the cart. This unloading on the go increases productivity dramatically because harvester combines do not need to stop to unload. In addition, it is not necessary for the harvester combines themselves to travel to grain trucks or bins at the side of the field each time the harvester combine is full. After a cart is loaded with grain by one or more combines, the grain is unloaded from the cart into a bin for temporary storage or into a waiting grain truck for transport to another location, such as a grain elevator. Because carts offer a combination of economy, versatility, production savings, and maneuverability, carts have been widely accepted by the farmer and widely produced by equipment manufacturers.

SUMMARY

One aspect of the present invention relates to a system including a cart, one or more sensors, one or more vehicle components, a vehicle controller, and one or more computers. The cart may include a hopper. The one or more computers may be configured to use the one or more sensors to determine whether a container is full at a first unloading location. The one or more computers may be configured to, if the container is determined to be full at the first unloading location, cause the vehicle controller to control the one or more vehicle components to move the cart from the first unloading location to a second unloading location. The first and second unloading locations may be different.

In some embodiments, the cart may include an auger assembly that includes a spout, and the first unloading location may be a location at which the spout is positioned over an opening of a container. In some embodiments, the one or more computers may include one or more processors and one or more non-transitory storage media. In some embodiments, the one or more computers may be further configured to use the one or more sensors to perform obstacle detection while the cart is moving from the first unloading location to the second unloading location.

In some embodiments, the system may further include a spout controller, the cart may include an auger assembly that includes a spout, and the one or more computers may be further configured to use the one or more sensors to determine whether unused container capacity at the first unloading location exists and, if unused container capacity at the first unloading location is determined to exist, cause the spout controller to move the spout to fill or attempt to fill the unused container capacity at the first unloading location.

In some embodiments, the cart may include an auger assembly. The one or more computers may be further configured to cause the vehicle controller to control the one or more vehicle components to move the cart to the first unloading location. The one or more computers may be further configured to use the one or more sensors to determine whether the cart has reached the first unloading location. The one or more computers may be further configured to, if the cart is determined to have reached the first unloading location, engage an auger of the auger assembly. The one or more computers may be further configured to use the engaged auger assembly to discharge material from the hopper to the container. In some embodiments, the one or more computers may be further configured to use the one or more sensors to perform obstacle detection while the cart is moving to the first unloading location. In some embodiments, the system may further include a flow gate and a flow gate controller, and using the engaged auger assembly to discharge material may include causing the flow gate controller to open and/or close the flow gate.

In some embodiments, the system may further include one or more load sensors and/or one or more hopper cameras, and the one or more computers are further configured to use the one or more load sensors and/or the one or more hopper cameras to determine whether the hopper is empty and, if the hopper is determined to be empty, shut the flow gate and/or shut down the auger assembly.

In some embodiments, the cart may include an auger assembly, and the one or more computers may be further configured to use the one or more sensors to determine whether the container is full and, if the container is determined to be full, shut down the auger assembly. In some embodiments, the system may further include a location and/or navigation system, and the one or more computers may be further configured to: use the location and/or navigation system to determine a location of the cart, use the location and/or navigation system to determine a route from the location of the cart to an auger folding location, and cause the vehicle controller to control the one or more vehicle components to move the cart to the auger folding location on the determined route. In some embodiments, the one or more computers may be further configured to use the one or more sensors to perform obstacle detection while the cart is moving to the auger folding location.

In some embodiments, the one or more computers may be further configured to: use the location and/or navigation system and/or the one or more sensors to determine whether the cart is at the auger folding location; if the cart is determined to be at the auger folding location, use the location and/or navigation system and/or the one or more sensors to determine whether the cart has proper clearance for the auger assembly to be moved from an operating position to a storage position; if the cart is determined to not have proper clearance, cause the vehicle controller to control the one or more vehicle components to move the cart to a new auger folding location; and, if the cart is determined to have proper clearance, cause the vehicle controller to control the one or more vehicle components to stop the cart. In some embodiments, the one or more computers may be further configured to: if the cart is determined to have proper clearance, use the one or more sensors to determine whether an obstacle that would interfere with movement of the auger assembly from the operating position to the storage position is present; and if no obstacle that would interfere with movement of the auger assembly from the operating position to the storage position is determined to be present, cause the vehicle controller to control the one or more vehicle components to stop the cart.

In some embodiments, the one or more computers may be further configured to: if an obstacle that would interfere with movement of the auger assembly from the operating position to the storage position is determined to be present, using the one or more sensors to determine whether the obstacle has cleared within a threshold amount of time; if the obstacle is determined to not have cleared within the threshold amount of time, cause the vehicle controller to control the one or more vehicle components to move the cart to a new auger folding location; and, if the obstacle is determined to have cleared within the threshold amount of time, cause the vehicle controller to control the one or more vehicle components to stop the cart. In some embodiments, the system may further include an auger positioner, and the one or more computers may be further configured to use the auger positioner to move the auger assembly from the operating position to the storage position.

Another aspect of the invention relates to a system including a cart, one or more sensors, a location and/or navigation system, one or more vehicle components, a vehicle controller, and one or more computers. The one or more computers may be configured to cause the vehicle controller to control the one or more vehicle components to move the cart to a container. The one or more computers may be configured to use the location and/or navigation system and/or the one or more sensors to determine whether the cart is near the container. The one or more computers may be configured to, if the cart is determined to be near the container, cause the vehicle controller to control the one or more vehicle components to stop the cart.

In some embodiments, the one or more computers may include one or more processors and one or more non-transitory storage media. In some embodiments, the one or more computers may be further configured to: use the location and/or navigation system to determine a location of the cart, use the location and/or navigation system to determine a route from the location of the cart to a location of the container, and cause the vehicle controller to control the one or more vehicle components to move the cart to the container on the determined route. In some embodiments, the system may further include one or more communication interfaces, and the one or more computers may be configured to use the one or more communication interfaces to receive the location of the container. In some embodiments, the location and/or navigation system may determine the route using one or more field maps and/or harvest data. In some embodiments, the one or more of field maps may include the locations of one or more permanent obstacles. In some embodiments, the harvest data may indicate areas of a field that have been harvested and/or areas of the field that have not been harvested.

In some embodiments, the one or more computers may be further configured to use the one or more sensors to perform obstacle detection while the cart is moving to the container. In some embodiments, the cart may include a hopper and an auger assembly, and the one or more computers may be further configured to: if the cart is determined to be near the container, use the location and/or navigation system and/or the one or more sensors to determine whether the cart has proper clearance for the auger assembly to be moved from a storage position to an operating position; if the cart is determined to not have proper clearance, cause the vehicle controller to control the one or more vehicle components to move the cart to a new location that is near the container; and, if the cart is determined to have proper clearance, cause the vehicle controller to control the one or more vehicle components to stop the cart.

In some embodiments, the one or more computers may be further configured to: if the cart is determined to have proper clearance, use the one or more sensors to determine whether an obstacle that would interfere with movement of the auger assembly from the storage position to the operating position is present; and, if no obstacle that would interfere with movement of the auger assembly from the storage position to the operating position is determined to be present, cause the vehicle controller to control the one or more vehicle components to stop the cart. In some embodiments, the one or more computers may be further configured to: if an obstacle that would interfere with movement of the auger assembly from the storage position to the operating position is determined to be present, using the one or more sensors to determine whether the obstacle has cleared within a threshold amount of time; if the obstacle is determined to not have cleared within the threshold amount of time, cause the vehicle controller to control the one or more vehicle components to move the cart to a new location that is near the container; and if the obstacle is determined to have cleared within the threshold amount of time, cause the vehicle controller to control the one or more vehicle components to stop the cart. In some embodiments, the system may further comprise an auger positioner, and the one or more computers may be further configured to use the auger positioner to move the auger assembly to the operating position.

Still another aspect of the invention relates to a system including a cart, one or more communication interfaces, a location and/or navigation system, one or more vehicle components, a vehicle controller, and one or more computers. The one or more computers may be configured to use the location and/or navigation system to determine a current location of the location and/or navigation system. The one or more computers may be configured to use the one or more communication interfaces to receive a location of a farm implement. The one or more computers may be configured to use the location and/or navigation system to determine a route from the current location to the location of the farm implement. The location and/or navigation system may determine the route using one or more field maps and harvest data, the one or more of field maps may include the locations of one or more permanent obstacles, the harvest data may indicate areas of a field that have been harvested and areas of the field that have not been harvested, and the determined route may avoid the one or more permanent obstacles and the areas of the field that have not been harvested. The one or more computers may be configured to cause the vehicle controller to control the one or more vehicle components to move the cart to the farm implement on the determined route.

In some embodiments, the one or more computers may include one or more processors and one or more non-transitory storage media. In some embodiments, the farm implement may be a container or a harvester. In some embodiments, the system may further include one or more sensors, and the one or more computers may be further configured to use the one or more sensors to perform obstacle detection while the cart is moving to the farm implement.

Yet another aspect of the invention relates to a method including: using one or more sensors to determine that a container is full at a first unloading location; and, in response to determining that the container is full at the first unloading location, causing a vehicle controller to control one or more vehicle components to move a cart from the first unloading location to a second unloading location. The first and second unloading locations may be different.

Still another aspect of the invention relates to a method including: causing a vehicle controller to control one or more vehicle components to move a cart to a container; using a location and/or navigation system and/or one or more sensors to determine that the cart is near the container; and, in response to determining that the cart is near the container, causing the vehicle controller to control the one or more vehicle components to stop the cart.

Yet another aspect of the invention relates to a method including: using a location and/or navigation system to determine a current location of the location and/or navigation system, using one or more communication interfaces to receive a location of a farm implement, and using the location and/or navigation system to determine a route from the current location to the location of the farm implement. The location and/or navigation system may determine the route using one or more field maps and harvest data. The one or more of field maps may include the locations of one or more permanent obstacles. The harvest data may indicate areas of a field that have been harvested and areas of the field that have not been harvested. The determined route may avoid the one or more permanent obstacles and the areas of the field that have not been harvested. The method may include causing a vehicle controller to control one or more vehicle components to move a cart to the farm implement on the determined route.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

FIG. 6 is a block diagram illustrating a system including a cart and/or vehicle according to some aspects of the present invention.

DETAILED DESCRIPTION OF PREFERRED EMBODIMENTS

Figures 1A, 1B, 1C, 1D, 1E:
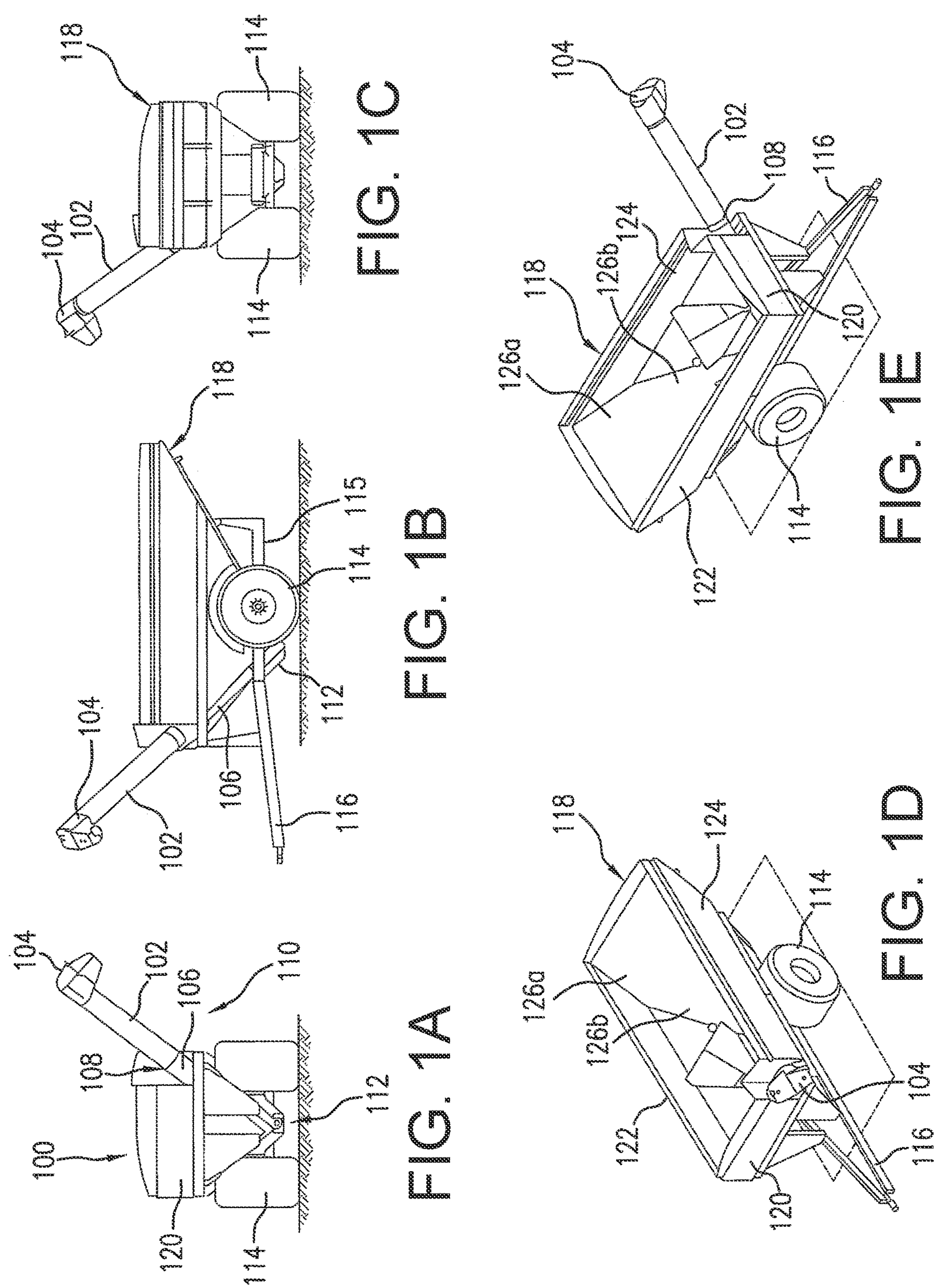
FIGS. 1A-1E depict several different views of a cart with an auger assembly in an operating position and embodying aspects of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

FIGS. 1A-1E are front, left side, rear, top and left side perspective, and top and right side perspective views, respectively, of a cart 100 embodying aspects of the present invention. FIGS. 2A-2E are front, left side, rear, top and left side perspective, and top and right side perspective views, respectively, of a cart 100 embodying aspects of the present invention. In some embodiments, the cart 100 may be capable of unloading material (e.g., grain) directly into a container (e.g., container 302 shown in FIG. 4) and may use a conveyor to do so. In some embodiments, as shown in FIGS. 1A-2E, the conveyor may be an auger assembly 110. In some embodiments, the auger assembly 110 may have any of the various known auger assembly configurations. In some embodiments, the auger structure may be contained inside a material (e.g., grain) holding container or hopper 118 of the cart 100 or located partially or entirely outside of it. In some embodiments, the auger assembly 110 may have a single auger or multiple augers. In some embodiments, the auger assembly 110 may be located at the front, side, back, or corner of the cart 100. In some embodiments, as shown in FIGS. 1A-2E, the auger assembly 110 may be a front-folding auger assembly. FIGS. 1A-1E show the front-folding auger assembly 110 in an operating position. FIGS. 2A-2E show the cart 100 with the front-folding auger assembly 110 in a storage position. However, it is not required that the cart 100 have an auger assembly 110 (or even a conveyer), and, in some alternative embodiments, the cart 100 may discharge material through an opening in the bottom of the hopper 118 and into a container below (e.g., using gravity).

In some embodiments, as shown in FIGS. 1A-2E, the material holding container or hopper 118 may be mounted on a frame 115 with wheels 114 and a hitch 116. The hopper 118 may have a front wall or side 120, laterally opposed side walls 122 and 124, and a rear wall or side composed of upper and lower rear wall portions 126*a* and 126*b*, which together define a material (e.g., grain) holding space with an open top and a bottom. In some embodiments, as best seen in FIGS. 1D and E, the upper rear wall portion 126*a* may extend downwardly from the top of hopper 118 at a first angle to intersect with the lower rear wall portion 126*b*, which may extend downwardly therefrom at a second angle which is steeper than the first angle to promote material flow towards the bottom of the hopper. An intake or receiving portion 112 of the auger assembly 110 may be positioned in a sump proximate the base or bottom of the hopper 118 to draw material from the bottom of the hopper into the auger assembly 110. The auger assembly 110 may extend upwardly from the intake 112 to a discharge portion 104 laterally and forwardly spaced from the hopper 118 to facilitate discharge of material (e.g., grain) from the auger assembly 110 into another container such as, for instance, another cart or rail car located to the side of the cart 100.

In some embodiments, as shown in FIGS. 1A-2E, the auger assembly 110 may include an upper auger assembly portion 102 and a lower auger assembly portion 106. The lower auger assembly portion 106 may extend from intake portion 112 at the bottom of hopper 118 to a forward corner of the hopper where the front wall 120 intersects one of the laterally opposed side walls 122 or 124. In some embodiments, the upper auger assembly portion 102 may be connected to the lower auger assembly portion 106 by a compound angle joint 108 that allows the upper auger assembly portion 102 to be moved between an operating position extending laterally and forwardly outward from the forward corner of the cart (as shown in FIGS. 1A-1E) and a storage position folded diagonally across the front of the cart (as shown in FIGS. 2A-2E). In some embodiments, the operating position is used for unloading material from the hopper 118, and the storage position is used when material is not being unloaded (e.g., when transporting or storing the cart 100). The discharge portion 104 may have a rotatable opening or spout that can be positioned to discharge material from the auger assembly 110 into another cart or the like located to the side of cart 100.

Figures 2A, 2B, 2C, 2D, 2E:
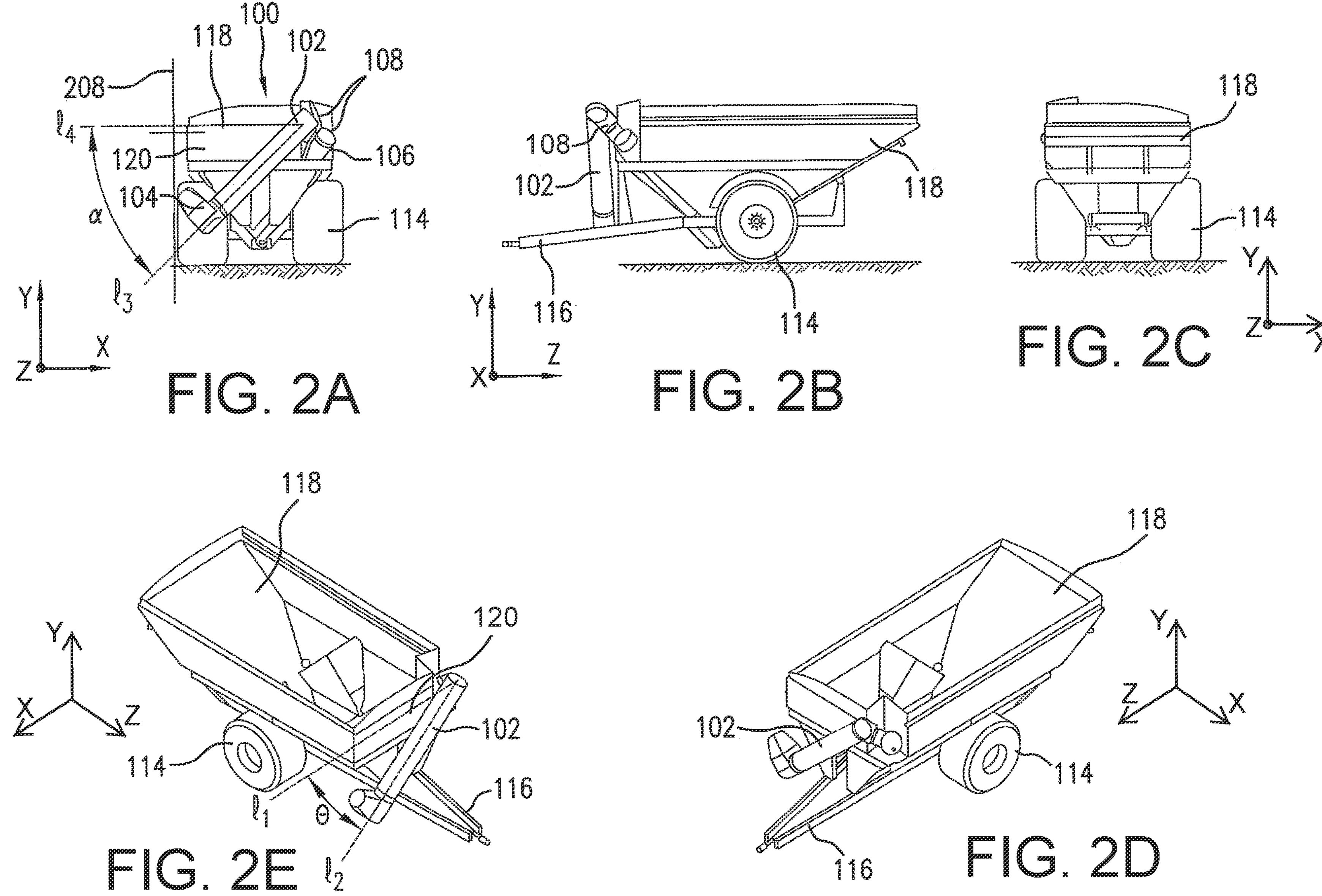
FIGS. 2A-2E depict several different views of a cart with an auger assembly in a storage position and embodying aspects of the present invention.

In the storage position, the upper auger assembly portion 102 may be folded at joint 108 so that it extends downwardly from the lower auger assembly portion 106 at an angle α (relative to horizontal) diagonally across the front of the hopper 118 and an angle θ from the front of the hopper 118. In some embodiments, as best seen in FIG. 2A, the length of the upper auger assembly portion 102 and the storage angle α may be such that, in the folded position, the upper auger assembly portion 102 extends diagonally across the front of the cart 100, and the entire auger assembly 110 may be disposed within the external dimensional boundaries of the cart 100. This may allow the upper auger to be longer allowing for better side and height characteristics (i.e., reach) when compared to other corner auger carts in which the front auger generally sits horizontally across the front or side for storage and transport. In some embodiments, the discharge portion 104 in the storage position does not interfere with or prevent access to the hitch 116. In some embodiments, when in the storage position, a longitudinal axis (2 of the upper auger assembly portion 102 may be oriented at a first storage offset angle θ relative to a line (1 running parallel to the front of the cart 100. Put another way, the first storage offset angle θ may be in the X-Z plane, as shown in FIG. 2E. In some embodiments, when in the storage position, a longitudinal axis (3 of the upper auger assembly portion 102 may additionally or alternatively be oriented at a second storage offset angle α with respect to a horizontal line (4 extending from the top of the lower auger assembly portion 106. Put another way, the second storage offset angle α may be in the X-Y plane, as shown in FIG. 2A. In some embodiments, angles θ and a may allow the auger assembly 110 to be folded such that the upper auger assembly portion 102 does not extend beyond an outer edge 208 of the cart 100.

Figure 3A:
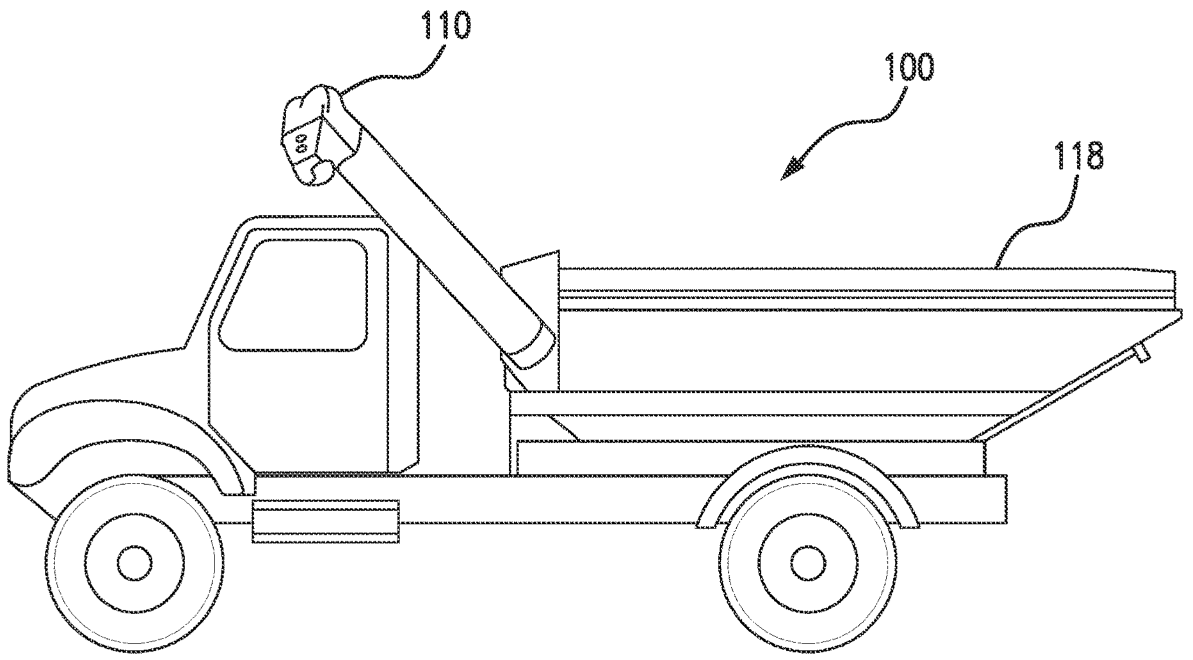
FIG. 3A illustrates a self-contained, self-propelled cart according to some aspects of the present invention.
Figure 3B:
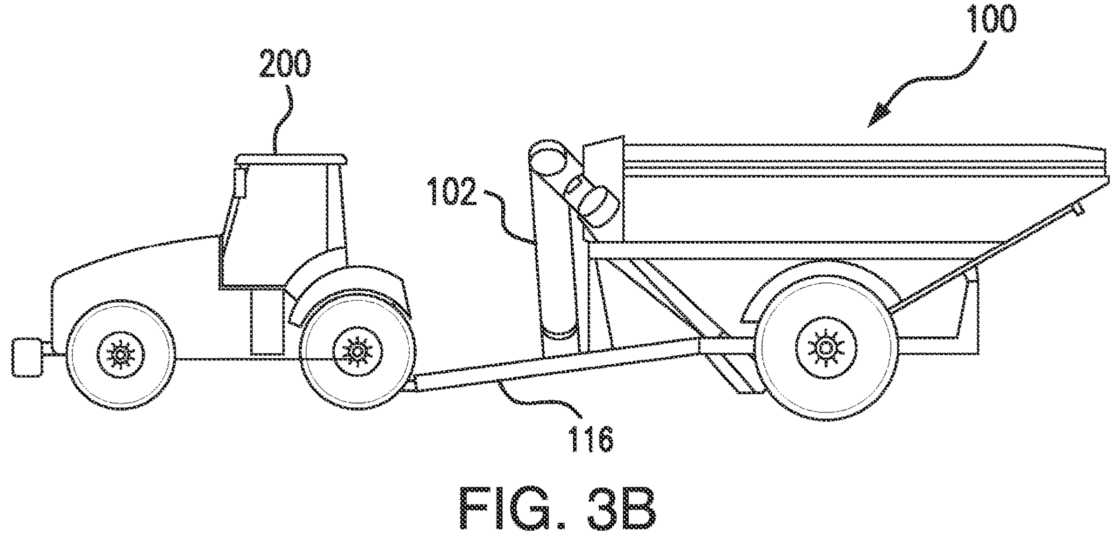
FIG. 3B illustrates a vehicle towing a cart according to some aspects of the present invention.
Figure 4:
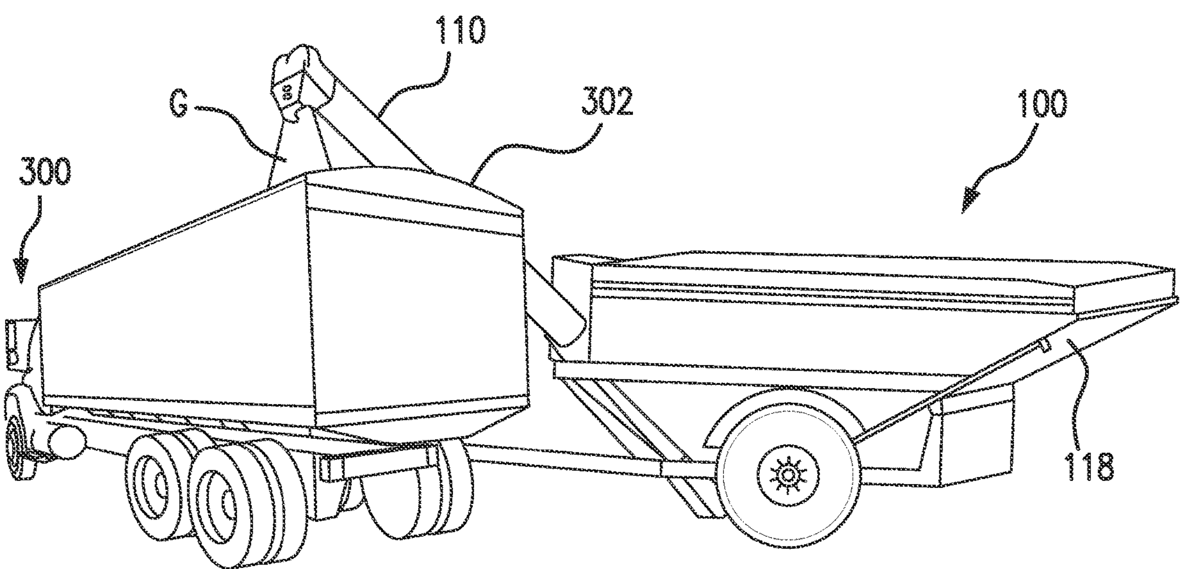
FIG. 4 illustrates a cart unloading grain to a storage container according to some aspects of the present invention.
Figure 5:
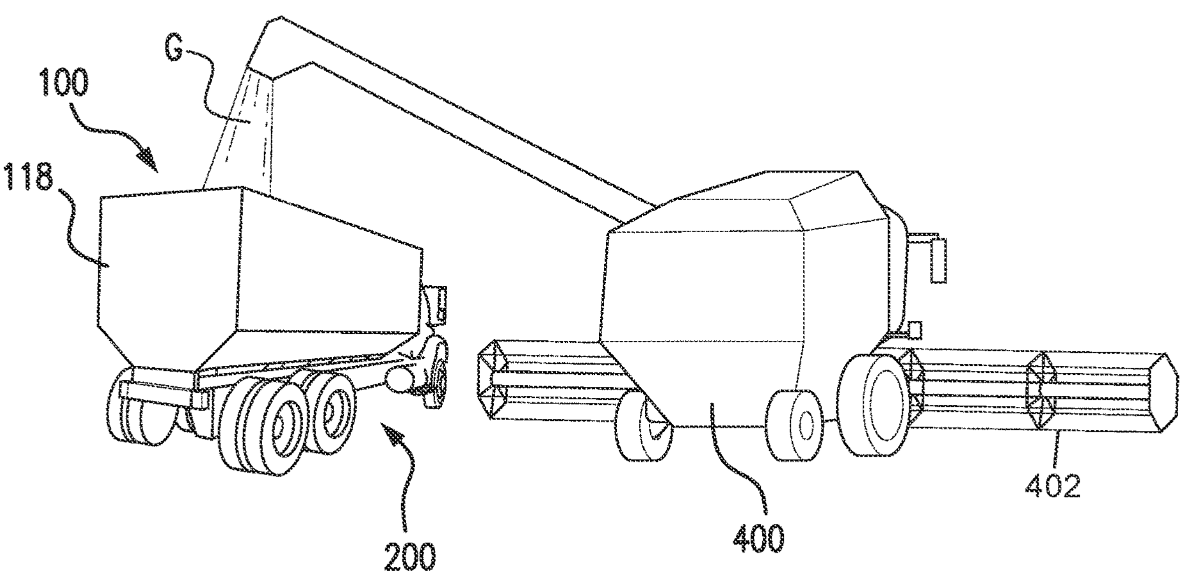
FIG. 5 illustrates a cart receiving grain from a combine harvester according to some aspects of the present invention.

In some embodiments, as shown in FIG. 3A, the cart 100 may be a self-contained, self-propelled cart that would not need to be towed by a towing vehicle. In some alternative embodiments, as shown in the FIG. 3B, a vehicle (e.g., tractor) 200 may tow the cart 100. In some embodiments, the hitch 116 of the cart 100 may connect the cart 100 to the vehicle 200. In some embodiments, the vehicle 200 may include a power takeoff, which may provide power for the auger assembly 110 of the cart 100. In some embodiments, as shown in FIG. 4, the cart 100 may use the auger assembly 110 to unload material G from the material holding container or hopper 118 to a storage container 302. In some embodiments, the container 302 may be an immobile material (e.g., grain) bin. However, this is not required, and, in some alternative embodiments, the container 302 may be part of a mobile container vehicle 300, such as, for example and without limitation, a truck, wagon, or railway car. In some embodiments, as shown in FIG. 5, the cart 100 may receive material G from a combine harvester 400. In some embodiments, as shown in FIG. 5, the combine harvester 400 may include a header or platform 402.

Figure 6:
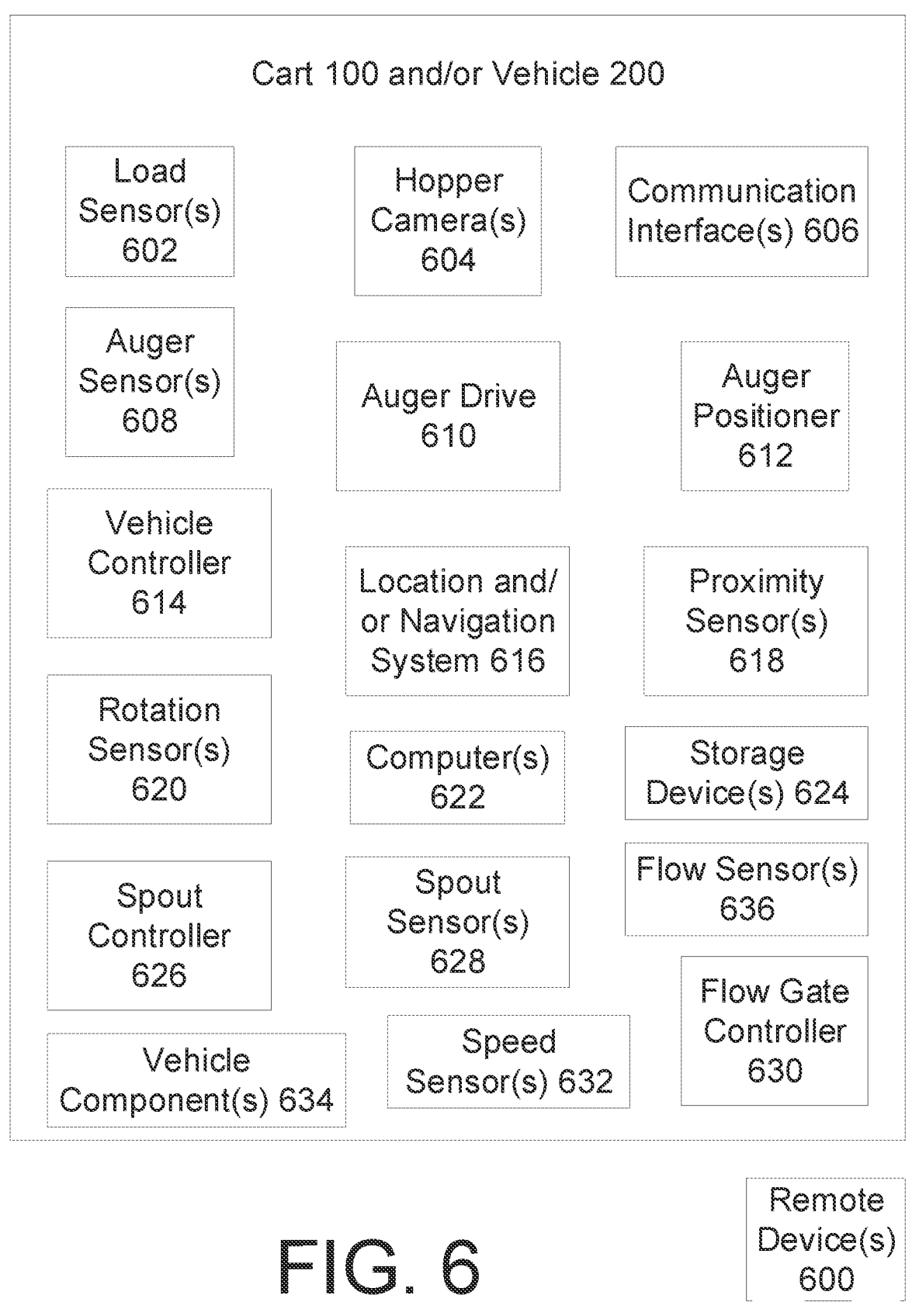

FIG. 6 is a block diagram of a non-limiting embodiment of a system including the cart 100 and/or vehicle 200. In some embodiments, as shown in FIG. 6, the system may include one or more remote devices 600. In some embodiments, although not shown in FIG. 6, the system may include one or more combine harvesters 400, one or more containers 302, and/or one or more container vehicles 300.

In some embodiments, as shown in FIG. 6, the cart 100 and/or vehicle 200 may include one or more load sensors 602, one or more hopper cameras 604, one or more communication interfaces 606, one or more auger sensors 608, an auger drive 610, an auger positioner 612, a vehicle controller 614, one or more location and/or navigation systems 616, one or more proximity sensors 618, one or more rotation sensors 620, one or more computers 622, one or more storage devices 624, a spout controller 626, one or more spout sensors 628, a flow gate controller 630, one or more speed sensors 632, one or more vehicle components 634, and/or one or more material movement/flow sensors 636. In embodiments where the cart 100 is a self-contained, self-propelled cart (see FIG. 3A), the cart 100 would include these components (e.g., including the vehicle controller 614 and the one or more vehicle components 634). In alternative embodiments where the system includes a cart 100 and a vehicle 200 that tows the cart 100 (see FIG. 3B), the cart 100 may include some of these components, and the vehicle 200 may include some others of these components.

In some embodiments, the one or more load sensors 602 may detect the weight of materials in the hopper 118 of the cart 100. In some embodiments, the one or more load sensors 602 may include a scale system. In some embodiments, one or more load sensors 602 may be located at the hitch 116 to measure hitch weight, and/or one or more load sensors 602 may be located on the cart axle (e.g., to measure weight on left and right sides of the cart 100). In some embodiments, the hopper 118 and/or vehicle 200 may include one or more features described in U.S. patent application Ser. No. 14/216,160, which is incorporated herein by reference in its entirety. In some embodiments, the one or more hopper cameras 604 may be configured to take images of the hopper 118 and any material (e.g., grain) therein. In some embodiments, images captured by the one or more hopper cameras 604 may be used to determine the height of material in the hopper 118. In some embodiments, the one or more load sensors 602 and the one or more hopper cameras 604 may be used to determine whether a load imbalance condition exists with respect to material in the hopper 118 that might cause the cart 100 to rollover or be unstable. In some embodiments, a load imbalance condition (i) may result in high stress areas, which may cause failure, (ii) may lead to inadequate traction for a self-propelled cart, (iii) may lead to large hitch weight, which may cause drawbar failure on a towing vehicle 200, and/or (iv) may lead to a low hitch weight, which may cause inadequate traction for a towing vehicle 200.

In some embodiments, the one or more communication interfaces 606 may be configured for wired or wireless communication using one or more communication standards. In some embodiments, the one or more communication interfaces may include one or more antennas for wireless communication. In some embodiments, the one or more communication interfaces 606 may be configured to receive and/or convey one or more of Wi-Fi signals, radio signals such as Bluetooth radio signals, and cellular signals. In some embodiments, the one or more communication interfaces 606 may include a RFID reader.

In some embodiments, the auger positioner 612 may control movement of the auger assembly 110 (e.g., movement of the upper auger assembly portion 102 of the auger assembly 110). In some embodiments, the auger positioner 612 may be configured to move the auger assembly 110 between a storage position and an operating position. In some embodiments, the auger positioner 612 may include one or more of hydraulics, mechanical linkage, and a linear actuator to move the auger assembly 110 between the storage position and the operating position. In some embodiments, the one or more auger sensors 608 may be configured to measure the position of the auger assembly 110 (e.g., as it moves between the storage position and the operating position).

In some embodiments, the cart 100 and/or vehicle 200 may include the one or more vehicle components 634. In some embodiments, the one or more vehicle components 634 may include, for example and without limitation, one or more of a power source for powering the cart 100 and/or vehicle 200, a steering component for steering the cart 100 and/or vehicle 200, a transmission component for shifting gears of the cart 100 and/or vehicle 200, a braking component for decelerating the cart 100 and/or vehicle 200 or preventing the cart 100 and/or vehicle 200 from moving, and an acceleration component for accelerating the cart 100 and/or vehicle 200. In some embodiments, the one or more vehicle components 634 may include a power takeoff, a prime mover, and/or an engine. In some embodiments, the vehicle controller 614 may control one or more of the one or more vehicle components 634 of the cart 100 and/or vehicle 200.

In some embodiments, the vehicle controller 614 may control one or more vehicle components 634 using one or more performance parameters. In some embodiments, the one or more performance parameters may include a minimum turning radius for the cart 100 and/or vehicle 200. In some embodiments, the one or more performance parameters may additionally or alternatively include one or more PTO RPM performance specifications that correlate flow gate opening and PTO RPM speed. In some embodiments, the one or more performance parameters may additionally or alternatively include vehicle and/or cart travel speed limits, which may be based on the weight of material (e.g., grain) in the hopper 118, load positioning, and/or hitch weight. For example, in some embodiments, the vehicle and/or cart travel speed limits may specify a maximum speed limit for each of one or more material and/or hitch weight ranges. In some embodiments, the one or more performance parameters may additionally or alternatively include one or more of the position of hopper 118 from hitch 116, the position of the location and/or navigation system 616 (e.g., a GPS receiver position), the distance from the axle of the cart 100 to the hitch 116 and/or location and/or navigation system 616, the overall width and/or length of the cart 100 and/or vehicle 200, the dimensions and position of the open top of the hopper 118, auger discharge position to hitch dimensions, auger fold swing dimensions, and auger discharge height.

In some embodiments, the cart 100 and/or vehicle 200 (e.g., the vehicle controller 614 of the cart 100 and/or vehicle 200) may take one or more of the performance parameters into account when controlling one or more of the vehicle components 634. For example, in some embodiments, the cart 100 and/or vehicle 200 may use the overall width of the cart 100 to determine a proper parallel travel offset distance relative to the discharge end of an offloading conveyor of the combine harvester 400. For another example, in some embodiments, the cart 100 and/or vehicle 200 may use the overall width of the cart 100 when approaching a container 302.

In some embodiments in which the cart 100 is towed by a vehicle 200, the cart 100 may convey the one or more performance parameters, which may be received by the vehicle 200. In some embodiments, the vehicle 200 may use one or more of the performance parameters conveyed by the cart 100 (e.g., position of the hopper 118 from the hitch 116, position of the GPS locator and/or navigation system 616, etc.) to perform a vehicle setup procedure, and/or the vehicle controller 614 of the vehicle 200 (or an operator of the vehicle 200) may take one or more of the received performance parameters into account when controlling one or more of the one or more vehicle components 634. In some embodiments, the vehicle 200 may use the dimensions of the open top of the hopper 118 relative to hitch 116 to set fore and aft offset distance for proper positioning of the open top of the hopper 118 of the cart 100 under the discharge end of an offloading conveyor of the combine harvester 400. In some embodiments, the vehicle 200 may use the discharge position of the auger assembly 110 relative to the hitch 116 for proper positioning for unloading into a container 302. In some embodiments, the vehicle 200 may use the turn radius limit to prevent a tire of the vehicle 200 from contacting the cart 100 or the cart driveline assembly.

In some embodiments, the auger drive 610 may be configured to power and/or control rotation of the auger of the auger assembly 110. In some embodiments, the auger drive 610 may be configured to engage with or receive power from the vehicle 200 (e.g., via a power takeoff, a prime mover, and/or an engine of the vehicle 200). In some embodiments, the one or more rotation sensors 620 may be configured to measure a rotational speed of the auger of the auger assembly 110. In some embodiments, the one or more rotation sensors 620 may include one or more hall-effect sensors, one or more magnet arrays, and/or pulse detection.

In some embodiments, the one or more location and/or navigation systems 616 may be configured to determine the location of the vehicle 200 and/or the cart 100. In some embodiments, only one of the cart 100 and vehicle 200 includes a location and/or navigation system 616, and, in some alternative embodiments, the cart 100 and vehicle 200 may each include a location and/or navigation system 616. In some embodiments, the location and/or navigation system 616 may include a global positioning system (GPS) receiver configured to determine a GPS location of the vehicle 200 and/or the cart 100. In some embodiments, the location and/or navigation system 616 may additionally or alternatively be configured to determine travel routes for the vehicle 200 and/or the cart 100 to another location (e.g., a route for travel from a current location of the cart 100 to the location of a container 302 or the location of a combine harvester 400). In some embodiments, the location and/or navigation system 616 may use one or more of field maps and/or harvest data to calculate the travel routes. In some embodiments, the one or more of field maps may include the locations (e.g., GPS locations) of one or more permanent obstacles (e.g., transmission line poles, trees, boulders, fences, barns, houses, waterways, ditches, gullies, etc.) located in the field. In some embodiments, the harvest data may indicate areas of the field that have been harvested and areas of the field that have not been harvested.

In some embodiments, the one or more proximity sensors 618 may use one or more of radar, sonar, laser scanning, cameras with image recognition technology, and/or GPS data to sense the environment around the vehicle 200 and/or cart 100 (e.g., to detect any obstacles in a movement path of the vehicle 200 and/or cart 100). In some embodiments, the one or more speed sensors 632 may be configured to detect the speed of the vehicle 200 and/or cart 100. In some embodiments, the speed sensors 632 may include one or more acceleration sensors configured to detect one or more accelerations (e.g., forward, lateral, and/or vertical acceleration) of the vehicle 200 and/or cart 100.

In some embodiments, the spout controller 626 may be configured to control movement (e.g., rotation and/or tipping) of the spout of the discharge portion 104 of the auger assembly 110. In some embodiments, the one or more spout sensors 628 may be configured to determine a position of the spout of the discharge portion 104 of the auger assembly 110. In some embodiments, the spout of the discharge portion of the auger assembly 110 may include the one or more material movement/flow sensors 636, which may be configured to determine unload rate of material from the cart 100. In some embodiments, the material movement/flow sensors 636 may use, for example and without limitation, ultrasonic technology and/or laser scanning to determine the unload rate. In some embodiments, as an alternative to or in addition to using one or more material movement/flow sensors 636, the cart 100 and/or vehicle 200 may use the one or more load sensors 602 and/or the hopper cameras 604 to determine the unload rate (e.g., as indicated by a change in the weight and/or height of material in the hopper 118).

In some embodiments, the flow gate controller 630 may be configured to open or close a flow gate/door that separates material (e.g., grain) at the bottom of the hopper 118 from the auger assembly 110. In some embodiments, opening the flow gate/door may allow material to flow from the hopper 118 into the intake 112 of the lower auger assembly portion 106 of the auger assembly 110.

In some non-limiting embodiments, the one or more storage devices 624 may be non-volatile and/or capable of being electronically erased and/or rewritten. In some embodiments, the one or more computers 622 may each include a processor and a non-transitory memory. In some non-limiting embodiments, the one or more computers 622 may control the overall operation of the vehicle 200 and/or cart 100. For example, the one or more computers 622 may control the vehicle 200 and/or the cart 100 for autonomous loading and unloading of the cart 100 (e.g., including autonomous travel between one or more combine harvesters 400 and one or more containers 302).

Figure 7:
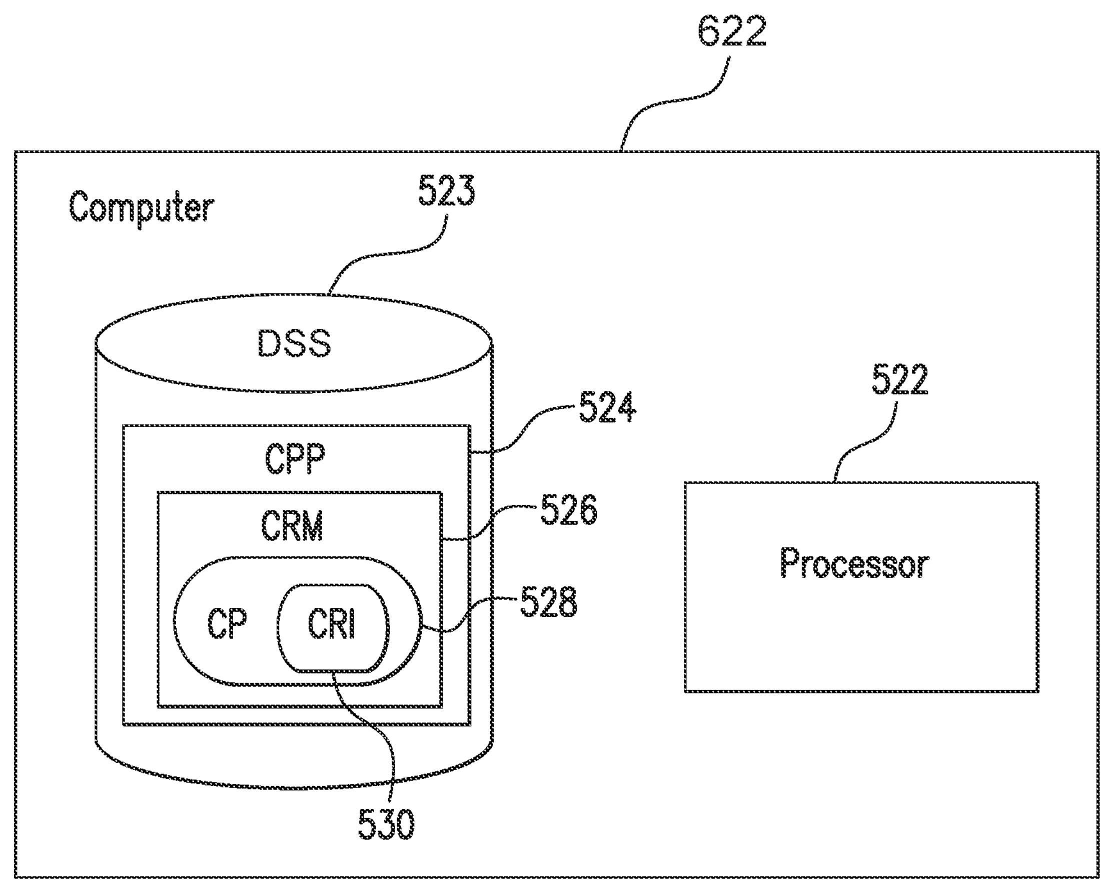
FIG. 7 illustrates a block diagram of a computer of a cart and/or vehicle according to some aspects of the present invention.

FIG. 7 is a block diagram of a non-limiting embodiment of a computer of the one or more computers 622 of the cart 100 and/or vehicle 200. As shown in FIG. 7, in some embodiments, the computer may include one or more processors 522 (e.g., a general purpose microprocessor) and/or one or more circuits, such as an application specific integrated circuit (ASIC), field-programmable gate arrays (FPGAs), a logic circuit, and the like. In some embodiments, the computer may include a data storage system (DSS) 523. The DSS 523 may include one or more non-volatile storage devices and/or one or more volatile storage devices (e.g., random access memory (RAM)). In embodiments where the computer includes a processor 522, the DSS 523 may include a computer program product (CPP) 524. CPP 524 may include or be a computer readable medium (CRM) 526. The CRM 526 may store a computer program (CP) 528 comprising computer readable instructions (CRI) 530. The CRM 526 may be a non-transitory computer readable medium, such as, but not limited, to magnetic media (e.g., a hard disk), optical media (e.g., a DVD), solid state devices (e.g., random access memory (RAM) or flash memory), and the like. In some embodiments, the CRI 530 of computer program 528 may be configured such that when executed by processor 522, the CRI 530 causes the computer to perform one or more of the steps described below with reference to the cart 100 and/or vehicle 200. In other embodiments, the computer may be configured to perform steps described herein without the need for a computer program. That is, for example, the computer may consist merely of one or more ASICs. Hence, the features of the embodiments described herein may be implemented in hardware and/or software.

In some embodiments, the cart 100 and/or vehicle 200 may additionally or alternatively include one or more gyro meters and/or one or more accelerometers. In some embodiments, the cart 100 and/or vehicle 200 may use the one or more gyro meters and/or one or more accelerometers to determine pitch and/or roll angles of the cart 100 and/or vehicle 200. In some embodiments, the pitch angle may be a front-to-back angle of the cart 100 and/or vehicle 200, and the roll angle may be a side-to-side angle of the cart 100 and/or vehicle 200. In some embodiments, the cart 100 and/or vehicle 200 may use the pitch and/or roll angles of the cart 100 and/or vehicle 200 in determining a proper parallel travel offset distance relative to the discharge end of an offloading conveyor of the combine harvester 400. In some embodiments, the cart 100 and/or vehicle 200 may use the pitch and/or roll angles of the cart 100 and/or vehicle 200 when approaching a container 302.

Figure 8:
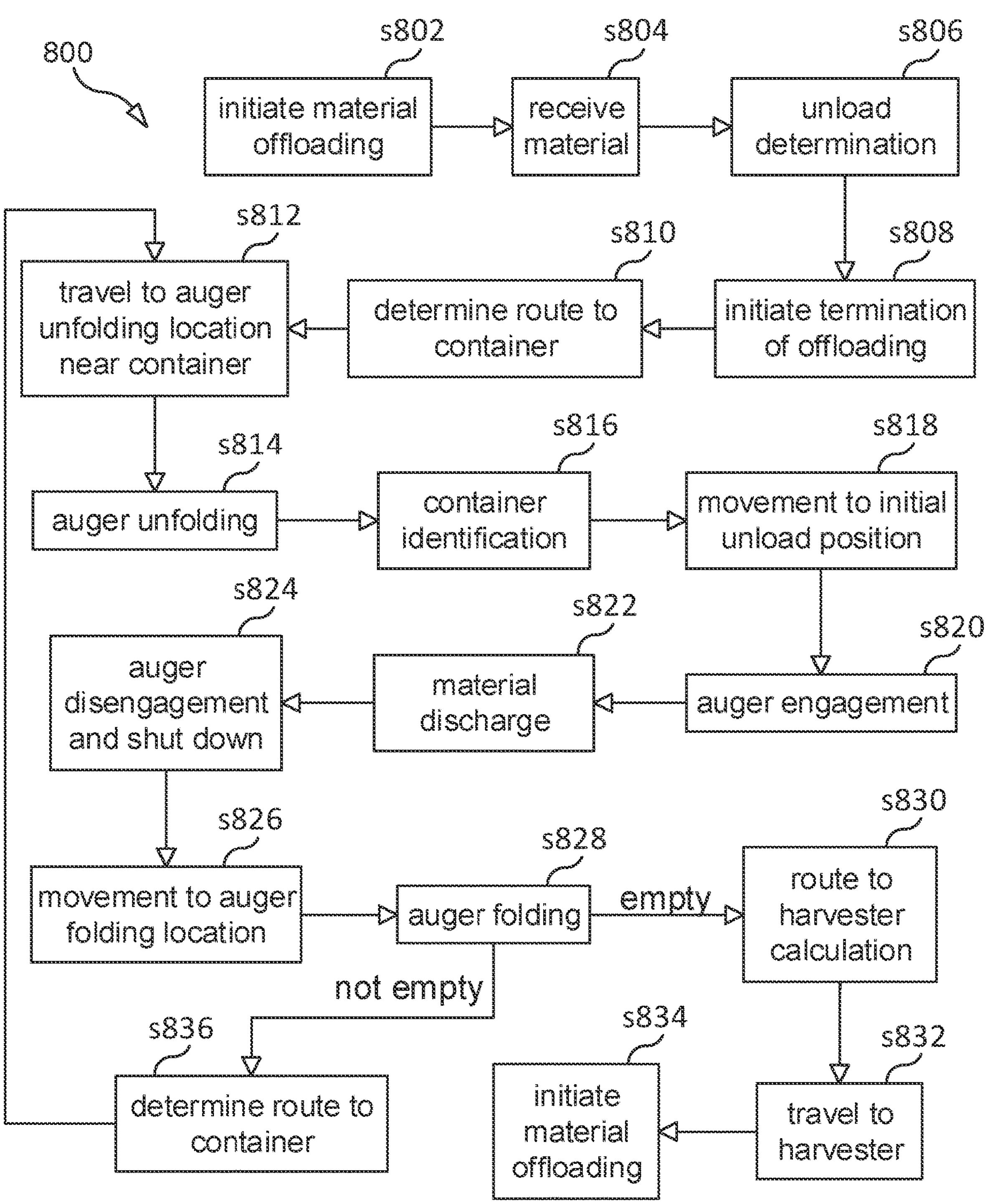
FIG. 8 is a flow chart illustrating an autonomous cart loading and unloading process according to some aspects of the present invention.

FIG. 8 is a flow chart illustrating a process 800 of automating the unloading of a cart 100 during active material (e.g., grain) harvest in a field of crop according to some non-limiting embodiments of the invention. In some embodiments, the cart 100 and/or vehicle 200 (e.g., a computer of the one or more computers 622 of the cart 100 and/or vehicle 200) may perform one or more steps of the process 800.

In some embodiments, as shown in FIG. 8, the process 800 may include a step 802 in which the cart 100 (and/or vehicle 200) initiates material offloading. In some embodiments, initiating material offloading in step 802 may include the cart 100 (and/or vehicle 200) using the one or more communication interfaces 606 to convey a cart ready indication (e.g., via a Wi-Fi signal, a radio signal such as a Bluetooth radio signal, or a cellular signal). In some embodiments, the cart 100 (and/or the vehicle 200) may convey a cart ready indication after determining that the cart 100 is positioned to receive material from the combine harvester 400. In some embodiments, the cart 100 may be positioned to receive material if the hopper 118 of the cart 100 is positioned below a discharge end of an offloading conveyor of the combine harvester 400. In some embodiments, the cart 100 (and/or vehicle 200) may determine that the cart 100 is positioned to receive material from the combine harvester 400 using the one or more proximity sensors 618 and/or the location and/or navigation system 616.

In some embodiments, the cart 100 (and/or vehicle 200) may additionally or alternatively determine that the cart 100 is positioned to receive material from the combine harvester 400 using information received from the combine harvester 400 (e.g., using the one or more communication interfaces 606). In some embodiments, the combine harvester 400 may convey the information automatically (e.g., when the cart 100 and/or vehicle 200 comes within a wireless communication range of the combine harvester 400 and/or when requested by the cart 100 and/or vehicle 200), and/or the combine harvester 400 may convey the information manually (e.g., under the control of an operator of the combine harvester. In some embodiments, the information from the combine harvester 400 may include real time information. In some embodiments, the information from the combine harvester 400 may include travel information and/or information about the combine harvester 400 itself (e.g., dimensions of the combine harvester 400). In some embodiments, the combine harvester 400 may convey the information periodically, on demand, and/or when changes to the information occur.

In some embodiments, the cart 100 may be positioned to receive material if (i) the hopper 118 of the cart 100 is positioned below a discharge end of an offloading conveyor of the combine harvester 400 and (ii) the vehicle 200 and/or cart 100 is moving at the same speed and in the same direction as the combine harvester 400. In some embodiments, the cart 100 (and/or the vehicle 200) may cause the vehicle controller 614 to control one or more of the one or more vehicle components 634 of the cart 100 and/or vehicle 200 (e.g., the steering component, the transmission component, the braking component, and/or the acceleration component) to match the speed and direction of the combine harvester 400 and maintain the positioning of the hopper 118 of the cart 100 below the discharge end of the offloading conveyor of the combine harvester 400 (e.g., as determined using the one or more proximity sensors 618). In some embodiments, the cart 100 (and/or the vehicle 200) may cause the vehicle controller 614 to control one or more of the one or more vehicle components 634 to maintain the cart 100 at an offset position (relative to the combine harvester 400) at which the hopper 118 of the cart 100 is positioned below a discharge end of an offloading conveyor of the combine harvester 400.

In some embodiments, the cart 100 (and/or the vehicle 200) may receive travel information of the combine harvester 400 (e.g., using the one or more communication interfaces 606). In some embodiments, the received travel information of the combine harvester 400 may include the speed, the direction, the acceleration (e.g., forward, lateral, and/or vertical acceleration), and/or a planned route of the combine harvester 400. In some embodiments, the cart 100 (and/or the vehicle 200) may receive the travel information from one or more remote devices 600 (e.g., a cloud server) to which the combine harvester 400 conveyed (e.g., uploaded) its travel information. In some embodiments, the cart 100 (and/or the vehicle 200) may use the received travel information of the combine harvester 400, the one or more speed sensors 632, and/or the one or more proximity sensors 618 to match the speed and direction of the combine harvester 400 and maintain the positioning of the hopper 118 of the cart 100 below the discharge end of the offloading conveyor of the combine harvester 400.

In some embodiments, the travel information may include the roll angle (e.g., side-to-side angle) and/or pitch angle (e.g., front-to-back angle) of the combine harvester 400. In some embodiments, the pitch and/or roll angles may be determined using one or more gyro meters and/or one or more accelerometers on the combine harvester 400. In some embodiments, the cart 100 (and/or the vehicle 200) may use the pitch and/or roll angles of the combine harvester 400 (and/or pitch and/or roll angles of the cart 100 and/or vehicle 200) to detect uneven ground and/or different elevations between the combine harvester 400 and the cart 100. In some embodiments, the one or more field maps may include the elevation information indicating the elevation at the different locations (e.g., GPS locations) covered by the one or more field maps, and the cart 100 (and/or the vehicle 200) may additionally or alternatively use the elevation information of the one or more field maps to detect the uneven ground and/or different elevations between the combine harvester 400 and the cart 100. In some embodiments, the cart 100 (and/or the vehicle 200) may compensate for the uneven ground and/or different elevations when determining, maintaining, and/or adjusting the offset position (relative to the combine harvester 400) at which point the hopper 118 of the cart 100 is positioned below the discharge end of the offloading conveyor of the combine harvester 400.

In some embodiments, the information received from the combine harvester 400 may include a width of the header or platform 402 of the combine harvester 400, a harvesting width of the combine harvester 400, and/or an indication of the difference (if any) between the harvesting width of the combine harvester 400 and the width of the header or platform 402 of the combine harvester 400. For example, in some embodiments, the harvested width may be smaller than the header or platform 402 of the combine harvester 400. In some embodiments, the cart 100 (and/or the vehicle 200) may use one or more of the width of the header or platform 402, the harvesting width, and the difference between the harvesting width and the width of the header or platform 402 to determine the offset position relative to the combine harvester 400. In some embodiments, the cart 100 (and/or the vehicle 200) may set the offset position relative to the combine harvester 400 so that the cart 100 (and/or the vehicle 200) remains outside the width of the header or platform 402 of the combine harvester 400 and, therefore, the cart 100 (and/or the vehicle 200) may avoid running into the header or platform 402.

In some embodiments, the cart 100 and/or vehicle 200 may approach the combine harvester 400 and position the hopper 118 of the cart 100 to receive material from the combine harvester 400 before the combine harvester 400 is ready to unload (e.g., before the combine harvester 400 has lowered, extended, and/or unfolded its offloading conveyor from a storage position to an operating/offloading position). In some embodiments, approaching the combine harvester 400 and positioning the hopper 118 in this manner may reduce the risk of collision between the cart 100 and/or vehicle 200 and the offloading conveyor of the combine harvester 400. In some embodiments, the cart ready indication may include confirmation to the harvester 400 (e.g., a cart self-check) that the cart 100 and/or vehicle 200 is in proper position to avoid undesired conditions such as contact with the offloading conveyor of the combine harvester 400 or the combine harvester 400 unloading contents onto the ground. In some embodiments, the harvester 400 may provide a confirmation/check that its offloading conveyor is in a particular position such as a storage position to avoid contact with the cart 100 and/or vehicle 200, and, after the cart 100 and/or vehicle 200 are in position, the harvester 400 may lower, extend, and/or unfold its offloading conveyer from a storage position to an operating/offloading position.

In some embodiments, the combine harvester 400 may receive the cart ready indication and initiate offloading of material from the combine harvester 400 to the cart 100. In some embodiments, initiating offloading of material from the combine harvester 400 to the cart 100 may include the combine harvester 400 engaging or powering on an auger and/or conveyor belt of the combine harvester 400 and/or opening a flow gate/door that separates material in a container of the combine harvester 400 from the offloading conveyor of the combine harvester 400 so that material can flow into the offloading conveyor.

In some alternative embodiments, the cart 100 (and/or vehicle 200) may initiate material offloading by positioning the cart 100 to receive material from the combine harvester 400 (without the cart 100 and/or vehicle 200 conveying a cart ready indication), and the combine harvester 400 may begin material offloading when the combine harvester 400 (or an operator of the combine harvester 400) determines that the cart 100 is positioned to receive material from the combine harvester 400.

In some embodiments, as shown in FIG. 8, the process 800 may include a step 804 in which the cart 100 receives material from the combine harvester 400. In some embodiments, the material received from the combine harvester 400 may fill the hopper 118 of the cart 100. In some embodiments, offloading of material from the combine harvester 400 to the cart 100 may be interrupted (e.g., temporarily).

In some embodiments, the material offloading may be halted if one or more of the cart 100, vehicle 200, harvester 400 detects contact (or the potential for contact) between the offloading conveyor of the harvester 400 and the cart 100 and/or vehicle 200 (e.g., due to terrain such as waterways). In some embodiments, the potential for contact may be detected based on the planned travel path taking the harvester 400 and cart 100 over a field map indicated terrain change such as, for example and without limitation, waterways, terraces, or elevation changes. In some embodiments, potential contact may be determined (e.g., in real time) by taking into account a location (e.g., GPS location) of the harvester 400, cart 100, and/or vehicle 200 (e.g., as determined by a location and/or navigation system of the harvester 400 and/or the location and/or navigation system 616 of the cart 100 and/or vehicle 200). In some embodiments, potential contact may additionally or alternatively be determined (e.g., in real time) by taking into account vehicle-to-cart hitch articulations. In some embodiments, the location and/or hitch articulation information may be used to determine whether the cart 100 (and/or vehicle 200) or harvester 400 has traveled over a terrain change, which may cause damage such as, for example and without limitation, to the harvester unload conveyor. In some embodiments, the cart 100 (and/or the vehicle 200) may additionally or alternatively use the roll angle of the combine harvester 400 (and/or the roll angle of the cart 100 and/or vehicle 200) to detect the potential for contact between the offloading conveyor of the harvester 400 and the cart 100 and/or vehicle 200. In some embodiments, if contact (or the potential for contact) is detected, the cart 100 (and/or the vehicle 200) may cause the vehicle controller 614 to move the cart 100 and/or vehicle 200 relative to the harvester 400 (e.g., by slowing, stopping, and/or steering away the cart 100 and/or vehicle 200).

In some embodiments, the material offloading may be halted when the combine harvester 400 has reached (or is about to reach) the end of the field or the end of a row and has to change direction (e.g., turn around) to continue harvesting. In some embodiments, after material offloading has been halted, the cart 100 (and/or the vehicle 200) may cause the vehicle controller 614 to control one or more of the one or more vehicle components 634 to return the cart 100 to the offset position (relative to the combine harvester 400) at which point the hopper 118 of the cart 100 is positioned below the discharge end of the offloading conveyor of the combine harvester 400 so that material offloading may resume. In some embodiments, the cart 100 and/or vehicle 200 may convey a cart ready indication to the combine harvester 400 when the cart 100 is in position and ready to receive material (e.g., grain) again.

In some embodiments, the step 804 may include the cart 100 (and/or the vehicle 200) performing a load balance check to determine whether any indication of an uneven load that might make the cart 100 unstable exists. In some embodiments, the cart 100 (and/or the vehicle 200) may use the one or more load sensors 602 (e.g., at the hitch 116 to measure hitch weight and/or on the cart axle to measure weight on the left and right sides of the cart 100) and/or the one or more hopper cameras 604 to determine whether a load imbalance condition exists with respect to material in the hopper 118. In some embodiments, the cart 100 (and/or the vehicle 200) may additionally or alternatively use sensors (e.g., gyro meters and/or accelerometers) to determine vehicle pitch and/or roll angles, steering angle sensors, and/or suspension height position sensors to determine whether a load imbalance condition exists with respect to material in the hopper 118 and/or uneven terrain conditions.

In some embodiments, if the cart 100 (and/or the vehicle 200) determines that a load imbalance condition exists while the cart 100 is receiving material from the combine harvester 400, the cart 100 (and/or the vehicle 200) may adjust the positioning of the hopper 118 relative to a discharge end of the offloading conveyor of the combine harvester 400 (e.g., by causing the vehicle controller 614 to control one or more of the one or more vehicle components 634 of the cart 100 and/or vehicle 200) to correct the imbalance by filling a different portion of the hopper 118. In some embodiments, the cart 100 (and/or the vehicle 200) may adjust the positioning of the hopper 118 relative to a discharge end of the offloading conveyor of the combine harvester 400 by changing a lateral offset and/or longitudinal offset of the cart 100 relative to the discharge end of the offloading conveyor of the combine harvester 400. In some embodiments, if the cart 100 (and/or the vehicle 200) determines that a load imbalance condition exists while the cart 100 is receiving material from the combine harvester 400, the cart 100 (and/or the vehicle 200) may additionally or alternatively convey a load imbalance indication to the combine harvester 400 (e.g., using the one or more communication interfaces 606). In some embodiments, if the combine harvester 400 receives a load imbalance indication, the combine harvester 400 may adjust the position of the discharge end of the offloading conveyor of the combine harvester 400.

In some embodiments, as shown in FIG. 8, the process 800 may include a step 806 in which the cart 100 (and/or vehicle 200) determines whether to unload the cart 100. In some embodiments, the unload determination may occur while the cart 100 is receiving material from a combine harvester 400. In some embodiments, the unload determination in step 806 may include the cart 100 (and/or vehicle 200) monitoring an amount of material in the hopper 118 of the cart 100. In some embodiments, the unload determination in step 806 may include determining whether the amount of material in the hopper 118 has reached one or more cart full capacity thresholds. In some embodiments, the amount of material in the hopper 118 reaching one or more cart full capacity thresholds may indicate that the hopper 118 is full. In some embodiments, the cart 100 (and/or vehicle 200) may determine to unload the cart 100 if the amount of material in the hopper 118 has reached one, some, or all of the one or more cart full capacity thresholds.

In some embodiments, the cart 100 (and/or vehicle 200) may monitor the amount of material in the hopper 118 using the one or more load sensors 602 to determine the weight of material (e.g., grain) in the hopper 118. In some embodiments, the one or more cart full capacity thresholds may include a cart full weight threshold, and the cart 100 (and/or vehicle 200) may determine whether the weight of material in the hopper 118 has reached the cart full weight threshold.

In some embodiments, the cart 100 (and/or vehicle 200) may monitor the amount of material in the hopper 118 by additionally or alternatively using the one or more hopper cameras 604 to determine the height of material (e.g., grain) in the hopper 118. In some embodiments, the one or more cart full capacity thresholds may include a cart full height threshold, and the cart 100 (and/or vehicle 200) may determine whether the height of material in the hopper 118 has reached the cart full height threshold. In some embodiments, the one or more computers 622 of the cart 100 and/or vehicle 200 receive images (e.g., video and/or pictures) from the one or more hopper cameras 604 and use image recognition technology to determine the height of material in the hopper 118. In some embodiments, the surface of the hopper 118 may include one or more horizontal lines, and the cart 100 (and/or vehicle 200) may determine the height of material in the hopper 118 by determining which (if any) of the one or more horizontal lines are visible.

In some embodiments, the cart 100 (and/or vehicle 200) may monitor the amount of material in the hopper 118 by additionally or alternatively using sensors (e.g., one or more proximity sensors and/or one or more pressure sensors) in the hopper 118 that are spaced at determined locations and sense whether the material has reached a predetermined level (e.g., height level).

In some embodiments, as shown in FIG. 8, the process 800 may include a step 808 in which the cart 100 (and/or vehicle 200) initiates termination of material offloading. In some embodiments, the initiation of termination of material offloading in step 808 may include the cart 100 (and/or vehicle 200) using the one or more communication interfaces 606 to convey a cart full indication (e.g., via a Wi-Fi signal, a radio signal such as a Bluetooth radio signal, or a cellular signal). In some embodiments, the combine harvester 400 may receive the cart full indication and terminate offloading of material from the combine harvester 400 to the cart 100. In some embodiments, terminating offloading of material from the combine harvester 400 to the cart 100 may include the combine harvester 400 disengaging or powering off an offloading conveyor of the combine harvester 400 and/or closing a flow gate/door that separates material in a container of the combine harvester 400 from the offloading conveyor of the combine harvester 400 to prevent material from flowing into the offloading conveyor. In some embodiments, after terminating material offloading, the combine harvester 400 may convey an indication that the material offloading has been terminated (e.g., via a Wi-Fi signal, a radio signal such as a Bluetooth radio signal, or a cellular signal). In some embodiments, the cart 100 (and/or vehicle 200) may receive the material offloading termination indication (e.g., using the one or more communication interfaces 606).

In some embodiments, termination of offloading of material by the combine harvester 400 may not occur simultaneously with the cart 100 (and/or vehicle 200) making the unload determination in step 806 or initiating termination of material offloading in step 808, and there may instead be a delay while the combine harvester 400 completes termination of material offloading. In some embodiments, the cart 100 (and/or vehicle 200) may account for this by making the determination to unload the cart 100 in step 806 while there is still sufficient room in the hopper 118 for the cart 100 to continue receiving material until the combine harvester 400 terminates offloading of material to the cart 100. In some embodiments, the hopper 118 may include extra capacity that acts as a safety buffer after the one or more cart capacity thresholds are reached. In some embodiments, this may prevent (or reduce the possibility of) material overflowing the hopper 118 while the combine harvester 400 completes termination of material offloading.

In some embodiments, the determination of whether to unload the cart 100 in step 806 may additionally or alternatively occur while the cart 100 is not receiving material from a combine harvester 400 (e.g., after an offloading event in which the combine harvester 400 has transferred material to the cart 100). In some embodiments, the unload determination while the cart 100 is not receiving material may include determining whether the amount of material in the hopper 118 has reached one or more approaching cart capacity thresholds, which may be lower than the one or more cart full capacity thresholds. In some embodiments, the amount of material in the hopper 118 reaching one or more approaching cart capacity thresholds may indicate that the hopper 118 is close to being full and does not have enough remaining capacity to begin a new offloading event in which the cart 100 receives further material from the combine harvester 400. In some embodiments, the one or more approaching cart capacity thresholds may include an approaching cart full weight threshold (e.g., monitored using the one or more load sensors 602) and/or an approaching cart full height threshold (e.g., monitored using the one or more hopper cameras 604). In some embodiments, the cart 100 (and/or vehicle 200) may determine to unload the cart 100 if the amount of material in the hopper 118 has reached one, some, or all of the one or more approaching cart capacity thresholds.

In some embodiments, if a determination to unload the cart 100 in step 806 occurs while the cart 100 is not receiving material from a combine harvester 400, the cart 100 (and/or vehicle 200) may convey a cart full indication (e.g., using the one or more communication interfaces 606) in step 808 so that the combine harvester 400 knows not to restart material offloading. In some embodiments, because material offloading is not presently occurring, the combine harvester 400 may convey an indication that the material offloading has been terminated, and the cart 100 (and/or vehicle 200)

may receive the material offloading termination indication (e.g., using the one or more communication interfaces 606).

In some embodiments, as shown in FIG. 8, the process 800 may include a step 810 in which the cart 100 (and/or vehicle 200) determines a route for travel to a container 302. In some embodiments, the step 810 may include the cart 100 (and/or vehicle 200) receiving one or more identifications of one or more containers 302 into which material can be unloaded. In some embodiments, the container identification may include one or more of (i) a location (e.g., a GPS location) of the container 302, (ii) a unique identification number for the container 302, (iii) a total capacity of the container 302, (iv) remaining material capacity of the container 302, and (v) an indication of whether the container 302 or a portion of the capacity thereof is reserved by one or more other carts 100.

In some embodiments, the cart 100 (and/or vehicle 200) may receive the one or more container identifications using the one or more communication interfaces 606 (e.g., by receiving a Wi-Fi signal, a radio signal such as a Bluetooth radio signal, or a cellular signal). In some embodiments, the cart 100 (and/or vehicle 200) may receive the one or more container identifications directly or indirectly from one or more containers 302. In some alternative embodiments, one or more containers 302 (and/or one or more container vehicles 300) may convey (e.g., upload) container identifications to the one or more remote devices 600, and the cart 100 (and/or vehicle 200) may receive (e.g., download) the one or more container identifications from the one or more remote devices 600.

In some embodiments, the cart 100 (and/or vehicle 200) may receive only one container identification (e.g., if the grain cart 100 is assigned to fill a particular container 302), and the cart 100 (and/or vehicle 200) may select the container 302 identified by the one container identification as the container 302 for unloading material from the cart 100. In some embodiments, a container 302 may only be assigned to one cart 100 to avoid multiple carts 100 unloading into the same container 302, to avoid carts 100 (and/or vehicles 200) from running into each other, and/or to prevent overloading the container 302. In some embodiments, if multiple carts 100 are assigned to one container 302, the carts 100 may be assigned to different sides, ends, or sections of the container 302. For example, a first cart 100 may be assigned to a first side and first end of the container 302, and a second cart 100 may be assigned to a second side, which is opposite the first side, and a second end, which is opposite the first end, of the same container 302. In some embodiments, multiple carts 100 assigned to the same container 302 may communicate (e.g., in real time) information to each other and/or to a cloud based program running on one or more remote devices 600. In some embodiments, the information may indicate the weight of material being unloaded from the cart 100 (e.g., to avoid overloading the container 302). In some embodiments, each of the multiple carts 100 assigned to one container 302 may be assigned a capacity (e.g., a weight capacity) of material to unload into the container 302, and the capacities may be assigned such they do not exceed the total capacity of the container 302.

In some embodiments, if the cart 100 (and/or vehicle 200) receives two or more container identifications, the cart 100 (and/or vehicle 200) may select one or more of the containers 302 for unloading material from the cart 100. In some embodiments, if the grain cart 100 or vehicle 200 is assigned to a particular container 302, the cart 100 (and/or vehicle 200) may select the container 302 to which the grain cart 100 or vehicle 200 is assigned as the container 302 for unloading material from the cart 100. In some alternative embodiments, the one or more remote devices 600 or the combine harvester 400 may select the container 302 for unloading material from the cart 100 (instead of the cart 100 and/or vehicle 200 making the selection) and convey an identification of the selected container 302 to the cart 100 and/or vehicle 200 (e.g., in response to a request from the cart 100 and/or vehicle 200 for a container selection).

In some alternative embodiments, the container selection may consider one or more of (i) route distance between the cart 100 and container 302, (ii) estimated travel time to the container 302, (iii) the volume of material in the hopper 118 of the cart 100, (iv) the remaining capacity of the container 302, (v) whether the container 302 or a portion of the capacity thereof is reserved by one or more other carts 100, and (vi) whether the container 302 is stationary or moving. In some embodiments, the cart 100 (and/or vehicle 200) may, for example, select the closest container 302 having a remaining capacity (e.g., remaining unreserved capacity) sufficient to receive the volume of material in the hopper 118 of the cart 100. In some alternative embodiments, the cart 100 (and/or vehicle 200) may select the one or more containers 302 that would result in the fastest unloading of the cart 100 (even if the material from the cart 100 would be unloaded into more than one container 302). In some further alternative embodiments, the cart 100 (and/or vehicle 200) may prioritize completing the filling of containers 302 and may select the one or more containers 302 that have the smallest remaining capacities (e.g., to get the most trucks 300 having full containers 302 on the road). In some embodiments, the container selection may be made based on selection preferences of an operator or manager. In some alternative embodiments in which the harvester 400 and/or a remote device 600 select one or more containers 302 for a cart 100 and assigns the selected one or more containers 302 to the cart 100 (instead of the cart 100 and/or vehicle 200 making the container selection), the harvester 400 and/or remote device 600 may select the one or more containers 302 based on any of the above considerations.

In some embodiments, after selecting one or more containers 302, the cart 100 (and/or vehicle 200) may reserve the one or more selected containers 302 (or portions thereof). In some embodiments, the cart 100 (and/or vehicle 200) may reserve the one or more selected containers 302 (or portions thereof) by conveying one or more container selections (e.g., using the one or more communication interfaces 606) directly or indirectly to the one or more selected containers 302, one or more combine harvesters 400, one or more other carts 100, and/or one or more other vehicles 200. For example, in some embodiments, the cart 100 (and/or vehicle 200) may convey the one or more container selections to one or more remote devices 600 (e.g., a cloud server), and the one or more selected containers 302, one or more combine harvesters 400, one or more other carts 100, and/or one or more other vehicles 200 may receive (e.g., download) the one or more container selections from the one or more remote devices 600. In some embodiments, the ability for the cart 100 (and/or the vehicle 200) to reserve a container 302 may prevent (or reduce the possibility of) multiple carts 100 from traveling to the same container 302, which may not have enough capacity for the material of the multiple carts 100.

In some embodiments, the cart 100 (and/or vehicle 200) may determine the route for travel from the current location of the cart 100 to the location of the selected container 302. In some embodiments, the cart 100 (and/or vehicle 200) may calculate the route using the location and/or navigation system 616. In some embodiments, the location and/or navigation system 616 may use one or more of field maps and/or harvest data. In some embodiments, the cart 100 (and/or vehicle 200) may receive (or have received) the field maps and/or harvest data using the one or more communication interfaces 606. In some embodiments, the cart 100 (and/or vehicle 200) may store the field maps and/or harvest data in the one or more storage devices 624. In some embodiments, the cart 100 (and/or vehicle 200) may receive the field maps and/or harvest data from the combine harvester 400 from which the cart 100 received material (and/or from one or more additional combine harvesters 400 that are harvesting the fields). In some embodiments, one or more harvester combines 400 may convey (e.g., upload) their harvest data to one or more remote devices 600 (e.g., a cloud server), and the cart 100 (and/or vehicle 200) may receive the harvest data from the one or more remote devices 600.

In some embodiments, the cart 100 (and/or vehicle 200) may calculate a route to the container 302 that avoids (to the extent possible) the one or more permanent obstacles included in the one or more of field maps and/or the areas of the field identified by the harvest data as not harvested (to avoid damage to unharvested crops that might occur if the vehicle 200 and/or cart 100 were to travel over and through areas that have not been harvested). In some embodiments, as harvesting that will take place in the near future may open up a better route, the route calculations may consider unharvested areas that are predicted to be harvested by the time the cart 100 and/or vehicle 200 would arrive. In some embodiments, the cart 100 (and/or vehicle 200) may calculate a route to the container 302 that avoids or reuses previous travel routes, such as tram lines (e.g., to reduce soil compaction). In some embodiments, the calculated route may, where possible, run with the direction of rows (e.g., inner perimeter rows) and/or ridges in the field to avoid knocking down ridges and/or reduce stress on components of the cart 100 and/or vehicle 200 (e.g., straddle duals, wheels, tires, frame, track systems, and the like).

In some embodiments, a combine harvester 400, cart 100, and/or vehicle 200 may mark areas and/or locations of new or previously undetected obstacles (e.g., steep uneven ground caused by rain washout) that the combine harvester 400, cart 100, or vehicle 200 encounters. In some embodiments, the combine harvester 400, cart 100, and/or vehicle 200 may mark a location as steep uneven ground if a hitch and/or roll angle (e.g., as detected by one or more gyro meters and/or one or more accelerometers) of the combine harvester 400, cart 100, or vehicle 200 exceeds an uneven ground steepness threshold. In some embodiments, the new or previously undetected obstacles may be included in the one or more field maps, and the calculated route may additionally avoid (to the extent possible) the new or previously undetected obstacles.

In some embodiments, the calculated route may take into consideration wet harvest season conditions and, to the extent reasonably possible, seek to stay at higher elevations, seek routes having at least a threshold elevation, and/or avoid low elevations that may collect or hold water. In some embodiments, information about wet field areas to avoid may be set by a user/operator/manager and/or discovered and marked by one or more combine harvesters 400, one or more carts 100, and/or one or more vehicles 200, which may have gotten stuck, had wheels slip, otherwise been halted or slowed by wet field conditions. In some embodiments, a combine harvester 400, cart 100, and/or vehicle 200 may mark areas and/or locations of drive wheel slips. In some embodiments, the information about wet field areas may be included in the one or more of field maps and/or the harvest data.

In some embodiments, the calculated route may take into account any downed carts 100, vehicles 200, and/or combine harvesters 400. In some embodiments, a cart 100, vehicle 200, and/or combine harvester 400 that is having difficulties (e.g., mechanical difficulties) may shut itself down and convey (e.g., upload) its location to the one or more remote devices 600 (e.g., a cloud server). The cart 100 (and/or vehicle 200) may receive information about the locations of any downed carts, vehicles, and/or combine harvesters from the one or more remote devices 600. In some embodiments, the information about the locations of any downed carts, vehicles, and/or combine harvesters may be included in the one or more of field maps and/or the harvest data. In some embodiments, when a downed cart, vehicle, or combine harvester is operational again (or is removed from the field), the cart, vehicle, or combine harvester may convey (e.g., upload) an update to the one or more remote devices 600 (e.g., a cloud server).

In some embodiments, all carts 100 (and/or vehicles 200) in a harvesting area or harvesting project may communicate or share planned travel routes with other, and the calculated route may additionally or alternatively take into account the shared planned travel routes to collisions with other carts 100 and/or vehicles 200.

Figure 9:
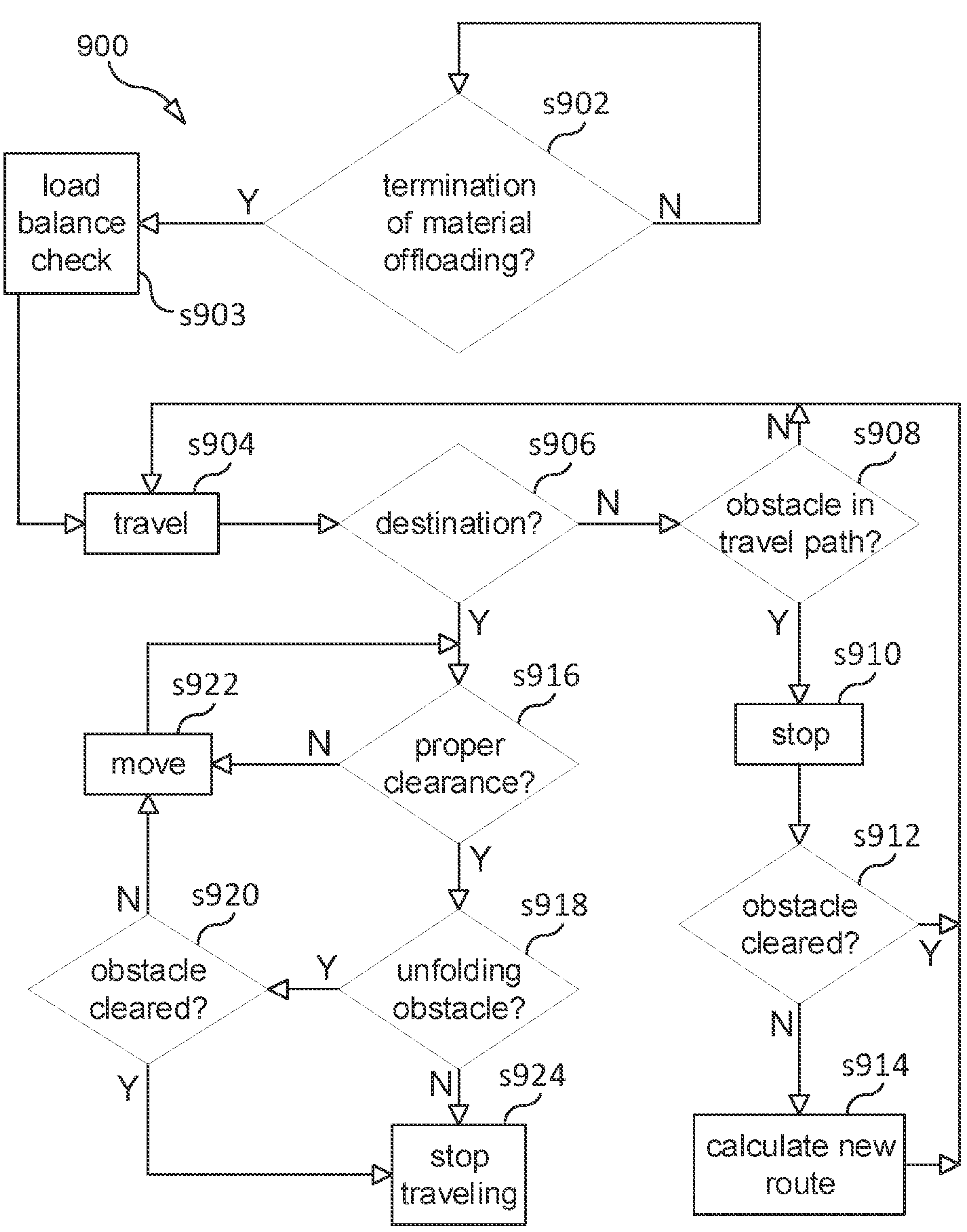
FIG. 9 is a flow chart illustrating a process of traveling to a container according to some aspects of the present invention.

In some embodiments, as shown in FIG. 8, the process 800 may include a step 812 in which the vehicle 200 and/or the cart 100 travel to the container 302. In some embodiments, in step 812, the vehicle 200 and/or the cart 100 may travel to the container 302 selected in step 810. FIG. 9 is a flow chart illustrating a process 900 of traveling to the container 302 according to some non-limiting embodiments of the invention. In some embodiments, one or more steps of the process 900 may be performed during the step 812 of the process 800 of FIG. 8. In some embodiments, the cart 100 and/or vehicle 200 (e.g., the one or more computers 622 of the cart 100 and/or vehicle 200) may perform one or more steps of the process 900.

In some embodiments, as shown in FIG. 9, the process 900 may include a step 902 in which the cart 100 (and/or the vehicle 200) determines whether the offloading of material from the combine harvester 400 has terminated. In some embodiments, the traveling process 900 may include the step 902 so that the vehicle 200 (and/or the cart 100) may not begin traveling to the container 302 and abandon the combine harvester 400 before the combine harvester 400 completes termination of material offloading. In some embodiments, the cart 100 (and/or the vehicle 200) may determine that material offloading has terminated if the cart 100 (and/or vehicle 200) has received a material offloading termination indication from the combine harvester 400 (e.g., using the one or more communication interfaces 606). In some embodiments, the cart 100 (and/or the vehicle 200) may determine that material offloading has terminated by additionally or alternatively using the one or more load sensors 602 and/or one or more hopper cameras 604. In some embodiments, the cart 100 (and/or the vehicle 200) would determinate (and/or confirm) that material offloading has terminated by using the one or more load sensors 602 to determine that the weight of material in the hopper 118 is not increasing and/or by one or more hopper cameras 604 to determine that the height of material in the hopper 118 is not increasing. In some embodiments, if the cart 100 (and/or the vehicle 200) determines that material offloading has terminated, the vehicle 200 and/or cart 100 may begin traveling to the container 302.

In some embodiments, as shown in FIG. 9, the process 900 may include a step 903 in which the cart 100 (and/or the vehicle 200) performs a load balance check to detect whether any indication of an uneven load that might tip over the cart 100 or otherwise make the cart 100 unstable during movement exists. In some embodiments, the cart 100 and/or vehicle 200 may include a load balance sensor system that detects an uneven weight distribution across the hopper 118 of the cart 100. In some embodiments, the load balance sensor system may be implemented by the one or more load sensors 602 and/or the one or more hopper cameras 604. In some embodiments, the load balance sensor system may additionally or alternatively be implemented using sensors to determine vehicle pitch and/or roll angles, steering angle sensors, and/or suspension height position sensors. In some embodiments, if no load imbalance is detected in step 903, the process 900 may proceed to step 904.

In some embodiments, as shown in FIG. 9, the process 900 may include a step 904 in which the vehicle 200 and/or the cart 100 may travel to the container 302. In some embodiments, the vehicle 200 and/or the cart 100 may travel to the container 302 using a determined route (e.g., the route determined in step 810 of the process 800 of FIG. 8). In some embodiments, in step 904, the vehicle 200 and/or the cart 100 may travel by using the vehicle controller 614 to control one or more of the one or more vehicle components 634 of the cart 100 and/or vehicle 200 (e.g., the steering component). In some embodiments, while traveling, the vehicle 200 and/or the cart 100 may use the one or more speed sensors 632 and/or GPS calculations from the location and/or navigation system 616 to monitor the speed of the vehicle 200 and cause the vehicle controller 614 to prevent the vehicle from exceeding a maximum speed. In some embodiments, while traveling, the vehicle 200 and/or the cart 100 may use the location and/or navigation system 616 to determine the current position of the vehicle 200 (and/or the cart 100) and, based on the current position, cause the vehicle controller 614 to control the vehicle components 634 to proceed on the determined route (e.g., the location and/or navigation system 616 may provide GPS guidance for the vehicle 200 to stay on the determined route).

In some embodiments, if the auger assembly portion 102 is in its operating position (as opposed to its storage position) while the cart 100 and/or the vehicle 200 is traveling in step 904 (e.g., because an operator of the cart 100 and/or the vehicle 200 has manually caused the auger assembly 110 to move to its operating position), the vehicle 200 and/or the cart 100 may use the location and/or navigation system 616 to avoid, to the extent possible, going within a threshold distance (e.g., 15 to 20 feet) from an outer field boundary, which may have a higher possibility of obstacles (e.g., trees, tree branches, transmission lines, buildings, or other structures) that could collide with the auger assembly portion 102 (and/or the discharge portion 104) in the operating position. In some embodiments, the threshold distance may be set by a manager (e.g., a remote manager via a remote device 600) or by an operator of the cart 100 and/or vehicle 200.

In some embodiments, as shown in FIG. 9, the process 900 may include a step 906 in which the cart 100 (and/or the vehicle 200) determines whether cart 100 (and/or the vehicle 200) has reached its destination near the container 302. In some embodiments, the step 906 may be performed while the vehicle 200 and/or cart 100 are traveling. In some embodiments, the cart 100 (and/or the vehicle 200) may determine that it is near the container 302 if it is within 10 feet of the container 302. However, this is not required, and, in alternative embodiments, the cart 100 (and/or the vehicle 200) may use different distances to determine whether it is near the container 302. In some embodiments, the cart 100 (and/or the vehicle 200) may determine whether it is near the container 302 using the location and/or navigation system 616 (e.g., by comparing the GPS location of the cart 100 and/or the vehicle 200 to the GPS location of the container 302) and/or the one or more proximity sensors 618. In some embodiments, if the cart 100 (and/or the vehicle 200) determines in step 906 that the cart 100 (and/or the vehicle 200) has reached its destination near the container 302, the process 900 may proceed to a step 916. Otherwise, if the cart 100 (and/or the vehicle 200) determines in step 906 that the cart 100 (and/or the vehicle 200) has not reached its destination near the container 302, the process 900 may continue traveling and proceed to a step 908.

In some embodiments, as shown in FIG. 9, the process 900 may include a step 908 in which the cart 100 (and/or the vehicle 200) determines whether any obstacles exist in the travel path of the vehicle 200 and/or cart 100. In some embodiments, the step 908 may be performed while the vehicle 200 and/or cart 100 are traveling. In some embodiments, the vehicle 200 and/or the cart 100 may use the one or more proximity sensors 618 to detect any obstacles (e.g., a vehicle, another cart, unharvested crop, a human or other animal, a hole, a tree, or a rock) that may be in the travel path of the vehicle 200 and/or cart 100. In some embodiments, the one or more proximity sensors 618 may use one or more of radar, sonar, laser scanning, cameras with image recognition technology, and/or GPS data to detect obstacles. In some embodiments, all carts 100 (and/or vehicles 200) in a harvesting area or harvesting project may communicate or share planned travel routes with other, and the cart 100 (and/or the vehicle 200) may additionally or alternatively use the shared planned travel routes to detect and avoid obstacles. In some embodiments, if the cart 100 (and/or the vehicle 200) determines that one or more obstacles exist in the travel path of the vehicle 200 and/or cart 100, the process 900 may proceed to a step 910. Otherwise, if the cart 100 (and/or the vehicle 200) determines that no obstacles exist in the travel path of the vehicle 200 and/or cart 100, the process 900 may proceed to the step 904, and the vehicle 200 and/or cart 100 may continue traveling to the container 302.

In some embodiments, as shown in FIG. 9, the process 900 may include a step 910 in which the cart 100 (and/or the vehicle 200) stops travel to avoid collision of the vehicle 200 and/or the cart 100 with the obstacle. In some embodiments, in step 910, the vehicle 200 and/or the cart 100 may cause the vehicle controller 614 to control one or more of the vehicle components 634 (e.g., the braking component and/or steering component) to avoid collision of the vehicle 200 and/or the cart 100 with the obstacle. In some embodiments, if an obstacle is detected in step 908, the vehicle 200 and/or the cart 100 may come to a full stop before colliding with the obstacle.

In some embodiments, the step 908 may additionally or alternatively include performing a load balance check to detect whether any indication of an uneven load that might tip over the cart 100 or otherwise make the cart 100 unstable during movement exists (e.g., using a load balance sensor system), and, if a load imbalance exists, the process 900 may proceed to step 910 to stop the vehicle 200 and/or cart 100.

In some embodiments, as shown in FIG. 9, the process 900 may include a step 912 in which the cart 100 (and/or the vehicle 200) determines whether the detected obstacle has cleared. In some embodiments, in step 912, the vehicle 200 and/or the cart 100 may use the one or more proximity sensors 618 (and/or seek input or a decision from a manager or operator of the vehicle 200 and/or the cart 100) to determine if the detected obstacle has cleared. In some embodiments, if the obstacle has cleared, the process 900 may proceed back to step 904, and the vehicle 200 and/or the cart 100 may continue on the determined route. In some embodiments, if the obstacle has not cleared after a threshold amount of time, the process 900 may proceed to a step 914. In some embodiments, as shown in FIG. 9, the process 900 may include a step 914 in which the cart 100 (and/or the vehicle 200) calculates a new route to the container 302 that avoids the obstacle. In some embodiments, the cart 100 (and/or vehicle 200) may determine a new route for travel from the current location of the cart 100 to the location of the container 302. In some embodiments, the cart 100 (and/or vehicle 200) may calculate the new route using the location and/or navigation system 616. In some embodiments, the location and/or navigation system 616 may use one or more of field maps and/or harvest data. In some embodiments, the one or more of field maps may include the locations (e.g., GPS locations) of one or more permanent obstacles (e.g., transmission line poles, trees, boulders, fences, barns, houses, etc.) located in the field. In some embodiments, the harvest data may indicate areas of the field that have been harvested and areas of the field that have not been harvested. In some embodiments, the cart 100 (and/or vehicle 200) may calculate a new route to the container 302 that avoids (to the extent possible) the one or more permanent obstacles and the areas of the field that have not been harvested (to avoid damage to unharvested crops that might occur if the vehicle 200 and/or cart 100 were to travel over and through areas that have not been harvested). In some embodiments, the cart 100 (and/or vehicle 200) may calculate a new route to the container 302 that avoids or reuses previous travel routes, such as tram lines (e.g., to reduce soil compaction). In some embodiments, after a new route is calculated, the process 900 may proceed back to step 904, and the vehicle 200 and/or the cart 100 may begin traveling to the container 302 using the newly calculated route.

In some embodiments, as shown in FIG. 9, the process 900 may include a step 916 in which the cart 100 (and/or the vehicle 200), after determining that the cart 100 (and/or the vehicle 200) has reached its destination near the container 302, may determine whether the cart 100 (and/or the vehicle 200) is far enough away from the container 302 that the cart 100 is able to deploy the upper auger assembly portion 102 of the auger assembly 110. In some embodiments, the cart 100 (and/or the vehicle 200) may determine whether the current location of the cart 100 allows proper clearance (relative to the container 302, any mobile container vehicle 300, and/or any other obstacles) for the auger assembly 110 to be moved (e.g., unfolded) from a storage position (e.g., as shown in FIGS. 2A-2E) to an operating position (e.g., as shown in FIGS. 1A-1E). In some embodiments, if the cart 100 (and/or the vehicle 200) determines that there is not proper clearance, the process 900 may proceed to a step 922. Otherwise, the process 900 may proceed from the step 916 to a step 918.

In some embodiments, determining whether there is proper clearance in step 916 may additionally or alternatively include determining whether the cart 100 (and/or the vehicle 200) is within a threshold distance from an outer field boundary, which may have a higher possibility of obstacles (e.g., trees, tree branches, transmission lines, buildings, or other structures) that could collide with the auger assembly portion 102 when it is moved to the operating position. In some embodiments, the cart 100 (and/or the vehicle 200) may determine that there is not proper clearance if the cart 100 (and/or the vehicle 200) is within the threshold distance from an outer field boundary.

In some embodiments, as shown in FIG. 9, the process 900 may include a step 918 in which the cart 100 (and/or the vehicle 200) determines whether there are any obstacles (e.g., trees and/or power lines) that might interfere with movement of the auger assembly 110 from its storage position to an operating position. In some embodiments, in step 918, the vehicle 200 and/or the cart 100 may use the one or more proximity sensors 618 to detect any obstacles that might interfere with movement of the auger assembly 110 from its storage position to the operating position. In some embodiments, if the cart 100 (and/or the vehicle 200) determines in step 918 that there are no obstacles to movement of the auger assembly 110 to the operating position, the process 900 may proceed to a step 924. Otherwise, if the cart 100 (and/or the vehicle 200) determines in step 918 that one or more obstacles exist that might interfere with movement of the auger assembly 110 to the operating position, the process 900 may proceed to a step 920.

In some embodiments, as shown in FIG. 9, the process 900 may include a step 920 in which the cart 100 (and/or the vehicle 200) determines whether the auger unfolding obstacle has cleared. In some embodiments, the cart 100 (and/or the vehicle 200) may determine whether the auger unfolding obstacle has cleared using the one or more proximity sensors 618. In some embodiments, if the obstacle has cleared, the process 900 may proceed to a step 924. In some embodiments, if the obstacle has not cleared after a threshold amount of time, the process 900 may proceed to a step 922.

In some embodiments, as shown in FIG. 9, the process 900 may include a step 922 in which the cart 100 (and/or the vehicle 200) moves from a current location, which is near the container 302 but was determined to (a) not have proper clearance for the auger assembly 110 to be moved from a storage position to an operating position and/or (b) have an obstacle that might interfere with movement of the auger assembly 110 from a storage position to an operating position, to a different location that is near the container 302. In some embodiments, the cart 100 (and/or the vehicle 200) may use the location and/or navigation system 616 and/or the one or more proximity sensors 618 to calculate the new/different location that is near the container 302. In some embodiments, in step 920, the cart 100 (and/or the vehicle 200) may cause the vehicle controller 614 to control one or more of the vehicle components 634 (e.g., the steering component, transmission component, and/or acceleration component) to move the vehicle 200 and/or cart 100 to the new location. In some embodiments, during the movement of step 922, the cart 100 (and/or the vehicle 200) may use the one or more proximity sensors 618 to detect and avoid any obstacles that may be in the travel path of the vehicle 200 and/or cart 100. In some embodiments, the process 900 may proceed from step 922 to steps 916 and 918 to determine whether the new location has proper clearance to unfold the auger and whether there are any unfolding obstacles.

In some embodiments, as shown in FIG. 9, the process 900 may include a step 924 in which the cart 100 (and/or the vehicle 200) brings the vehicle 200 and/or cart 100 to a full stop (e.g., by causing the vehicle controller 614 to control a braking component of the one or more of the vehicle components 634). In some embodiments, bringing the vehicle 200 and/or cart 100 to a full stop may include using the one or more speed sensors 632 to confirm that the vehicle 200 and/or cart 100 have stopped.

Returning to FIG. 8, in some embodiments, the process 800 may include a step 814 in which the cart 100 (and/or the vehicle 200) moves (e.g., unfolds) the auger assembly 110 from its storage position to an operating position. In some embodiments, the cart 100 (and/or the vehicle 200) may move the auger to the operating position after stopping at a location (or getting below a slow travel speed threshold) near the container 302 that has proper clearance and is free of obstacles to moving the auger to the operating position. In some embodiments, in step 814, the cart 100 (and/or vehicle 200) may move the auger assembly 110 to the operating position using the auger positioner 612. In some embodiments, the step 814 may include the cart 100 (and/or vehicle 200) using the one or more auger sensors 608 and/or the one or more proximity sensors 618 to determine the position of the upper auger assembly portion 102 of the auger assembly 110 as it moves from the storage position to the operating position. In some embodiments, the cart 100 (and/or vehicle 200) may disengage the auger positioner 612 after the auger assembly portion 102 reaches the operating position.

In some embodiments, while moving the upper auger assembly portion 102 in step 814, the cart 100 (and/or vehicle 200) may perform obstacle detection (e.g., using the radar, sonar, laser scanning, and/or cameras with image recognition technology of the one or more proximity sensors 618) to prevent the upper auger assembly portion 102 from colliding with any obstacles in the unfolding path. In some embodiments, if an obstacle is detected while moving the upper auger assembly portion 102 of the auger assembly 110 to its operating position in step 814, the cart 100 (and/or vehicle 200) may use the auger positioner 612 to stop movement of the upper auger assembly portion 102 before collision. In some embodiments, if an obstacle is detected, the cart 100 (and/or vehicle 200) may use the auger positioner 612 to return the upper auger assembly portion 102 to its storage position. In some embodiments, the cart 100 (and/or vehicle 200) may perform obstacle detection while returning the upper auger assembly portion 102. In some embodiments, if an obstacle is detected, the cart 100 (and/or vehicle 200) may determine whether the obstacle has been removed (e.g., within a certain amount of time). If the obstacle is determined to have been removed, the cart 100 (and/or vehicle 200) may try again to move the upper auger assembly portion 102 of the auger assembly 110 to its operating position. If the obstacle is still present, the cart 100 (and/or vehicle 200) may move to a new location for unfolding the auger assembly 110 (e.g., by proceeding back to step 812 of the process 800 of FIG. 8 and/or to step 922 of the process 900 of FIG. 9).

In some embodiments, as shown in FIG. 8, the process 800 may include a step 816 in which the cart 100 (and/or vehicle 200) identifies the container 302. In some embodiments, in step 816, the cart 100 (and/or the vehicle 200) may use the one or more communication interfaces 606 to obtain container information from the container 302. In some embodiments, the container 302 may include a radio frequency identification (RFID) tag, the one or more communication interfaces 606 may include an RFID tag reader, and the one or more communication interfaces 606 may receive the container information by reading the RFID tag of the container 302. In some embodiments, the container 302 may include a wireless communication interface that conveys wirelessly the container information (e.g., using a Wi-Fi signal, a radio signal such as a Bluetooth radio signal, or a cellular signal), and the one or more communication interfaces 606 may receive the container information conveyed by the wireless communication interface of the container 302. In some embodiments, the container 302 may have container information (e.g., a container identification) printed on one or more sides of the container 302, and the cart 100 (and/or the vehicle 200) may use one or more cameras of the one or more proximity sensors 618 and image recognition technology to obtain the container information. In some embodiments, the cart 100 (and/or the vehicle 200) may determine the container information based on a measured length, height, and/or width of the container 302 and/or by using a database of container information, which may be located in the one or more storage devices 624 of the cart 100 and/or vehicle 200 and/or in the one or more remote devices 600. For example, in some embodiments, the cart 100 (and/or the vehicle 200) may convey a measured length, height, and/or width of the container 302 to the one or more remote devices 600 (e.g., using the one or more communication interfaces 606) and, in response, receive container information conveyed by the one or more remote devices 600.

In some embodiments, the container information may include a container identification. In some embodiments, the cart 100 (and/or the vehicle 200) may use the container identification to confirm that the container 302 is the intended container (e.g., the container 302 selected in step 810).

In some embodiments, the container information may additionally or alternatively include one or more container indications. In some embodiments, the one or more container indications may identify one or more of the container opening size, the container position, the container total capacity, and the container remaining capacity. In some alternative embodiments in which the container information includes a container identification for the container 302 but does not include one or more container indications for the container 302, the cart 100 (and/or the vehicle 200) may use the container identification to look up the one or more container indications for the container 302. In some embodiments, one or more container indications for each of one or more container identifications may be stored in a storage device of the cart 100 and/or the vehicle 200 (e.g., in a storage device 624), and the cart 100 (and/or the vehicle 200) may look up the one or more container indications by using the container identification for the container 302 to retrieve the one or more container indications from the storage device. In some alternative embodiments, the cart 100 (and/or the vehicle 200) may look up the one or more container indications by using the one or more communication interfaces 606 to convey the container identification (e.g., using a Wi-Fi signal, a radio signal such as a Bluetooth radio signal, or a cellular signal) and receive the one or more container indications from one or more remote devices 600. In some further alternative embodiments, the cart 100 and/or the vehicle 200 may have already received the one or more container indications (e.g., when determining a route to the container 302 in step 810, which may include selecting a container 302).

In some embodiments, as shown in FIG. 8, the process 800 may include a step 818 in which the cart 100 (and/or vehicle 200) moves to an initial unloading location. In some embodiments, the cart 100 (and/or the vehicle 200) may cause the vehicle controller 614 to control one or more of the one or more vehicle components 634 of the cart 100 and/or vehicle 200 (e.g., the steering component, the transmission component, the braking component, and/or the acceleration component) to move to the initial unloading location. In some embodiments, the initial unloading location may be the location at which the spout of the discharge portion 104 of the auger assembly 110 of the cart 100 is positioned over the opening of the container 302. In some embodiments, the cart 100 (and/or vehicle 200) may determine the initial unloading location using the container information received in step 810 and/or step 816. In some embodiments, the cart 100 (and/or vehicle 200) may additionally or alternatively determine the initial unloading location using the one or more proximity sensors 618 (e.g., using sonar, radar, laser scanning, and/or cameras with image recognition technology). In some embodiments, during movement to the initial unloading location, the cart 100 (and/or vehicle 200) may perform obstacle detection (e.g., using the one or more proximity sensors 618) to prevent the vehicle 200, cart 100, and auger assembly 110 from colliding with the container 302, any container vehicle 300, and any other obstacles that may present themselves.

In some embodiments, moving to the initial unloading location in step 818 may include using the location and/or navigation system 616 to determine a route from the current position of the cart 100 and/or vehicle 200 (e.g., using one or more of field maps and/or harvest data). In some embodiments, the determined route may, to the extent possible, stay at least a threshold distance from an outer field boundary, which may have a higher possibility of obstacles (e.g., trees, tree branches, transmission lines, buildings, or other structures) that could collide with the auger assembly portion 102 in the operating position.

In some embodiments, moving to the initial unloading location in step 818 may include the cart 100 and/or vehicle 200 confirming that the container 302 is stationary. In some embodiments, the cart 100 and/or vehicle 200 may confirm that the container 302 is stationary before the cart 100 and/or 200 begins movement to the initial unloading location.

In some embodiments, moving to the initial unloading location in step 818 may position the spout of the discharge portion 104 over the opening of the container 302 such that the material would clear the opening of the container 302 when being discharged. In some embodiments, the initial load position may depend on whether the container 302 already includes material (e.g., grain). In some embodiments, if the container 302 is empty, the initial unload positon may position the spout of the discharge portion 104 in an optimum location such that the container 302 would begin to be filled starting at the end nearest to the direction from which the cart 100 is approaching and with the spout aligned or nearly aligned with the longitudinal center line of the container 302 (e.g., a center line parallel with the direction of movement of the container 302). In some embodiments, if the container 302 already includes material, the initial load position may depend on one or more load distribution parameters of the material in the container 302. For example, if the container 302 is already filled at the end nearest to the direction from which the cart 100 is approaching, the initial unload positon may position the spout of the discharge portion 104 in an optimum location such that the container 302 would begin to be filled starting at the first location from the end nearest to the direction from which the cart 100 is approaching that is not filled (and with the spout aligned or nearly aligned with the longitudinal center line of the container 302).

In some embodiments, the cart 100 (and/or the vehicle 200) may use the pitch and/or roll angles of the cart 100 and/or vehicle 200 (e.g., as detected by gyro meters and/or accelerometers) to detect uneven ground and/or different elevations between the cart 100 and the container 302. In some embodiments, the one or more field maps may include the elevation information indicating the elevation at the different locations (e.g., GPS locations) covered by the one or more field maps, and the cart 100 (and/or the vehicle 200) may additionally or alternatively use the elevation information of the one or more field maps to detect the uneven ground and/or different elevations between the combine harvester 400 and the cart 100. In some embodiments, the cart 100 (and/or the vehicle 200) may compensate for the uneven ground and/or different elevations when determining the initial unload position and/or performing obstacle detection to prevent the vehicle 200, cart 100, and auger assembly 110 from colliding with the container 302.

In some embodiments, as shown in FIG. 8, the process 800 may include a step 820 in which the cart 100 (and/or the vehicle 200) engages the auger of the auger assembly 110. In some embodiments, engaging the auger assembly 110 may be performed after the cart 100 is in the initial unload positon. In some embodiments, engaging the auger assembly 110 may include the cart 100 (and/or the vehicle 200) setting a speed of the prime mover and/or engine of the vehicle 200 at a safe engagement speed. In some embodiments, the safe engagement speed may be a speed at which no damage to auger drive 610 would occur when the auger is started. In some embodiments, setting the speed of the prime mover and/or the engine of the vehicle 200 at the safe engagement speed may include decreasing the speed of the prime mover and/or the engine to the safe engagement speed. In some embodiments, engaging the auger assembly 110 may include engaging the auger drive 610 to power the auger of the auger assembly 110 (e.g., via a power takeoff, a prime mover, and/or an engine of the vehicle 200). In some embodiments, engaging the auger assembly 110 may include the cart 100 (and/or the vehicle 200) adjusting (e.g., increasing) the engine speed or prime mover speed to achieve the proper rotational speed of the auger of the auger assembly 110. In some embodiments, the proper rotational speed may be, for example and without limitation, an auger RPM in the range of 500 to 600 and/or an auger drive RPM of 1000. In some embodiments, the cart 100 (and/or the vehicle 200) may use one or more rotation sensors 620 to determine the rotational speed of the auger of the auger assembly 110, and the cart 100 (and/or the vehicle 200) may use the determined rotational speed of the auger to adjust the engine speed or prime mover speed to achieve the proper rotational speed of the auger of the auger assembly 110.

Figure 10:
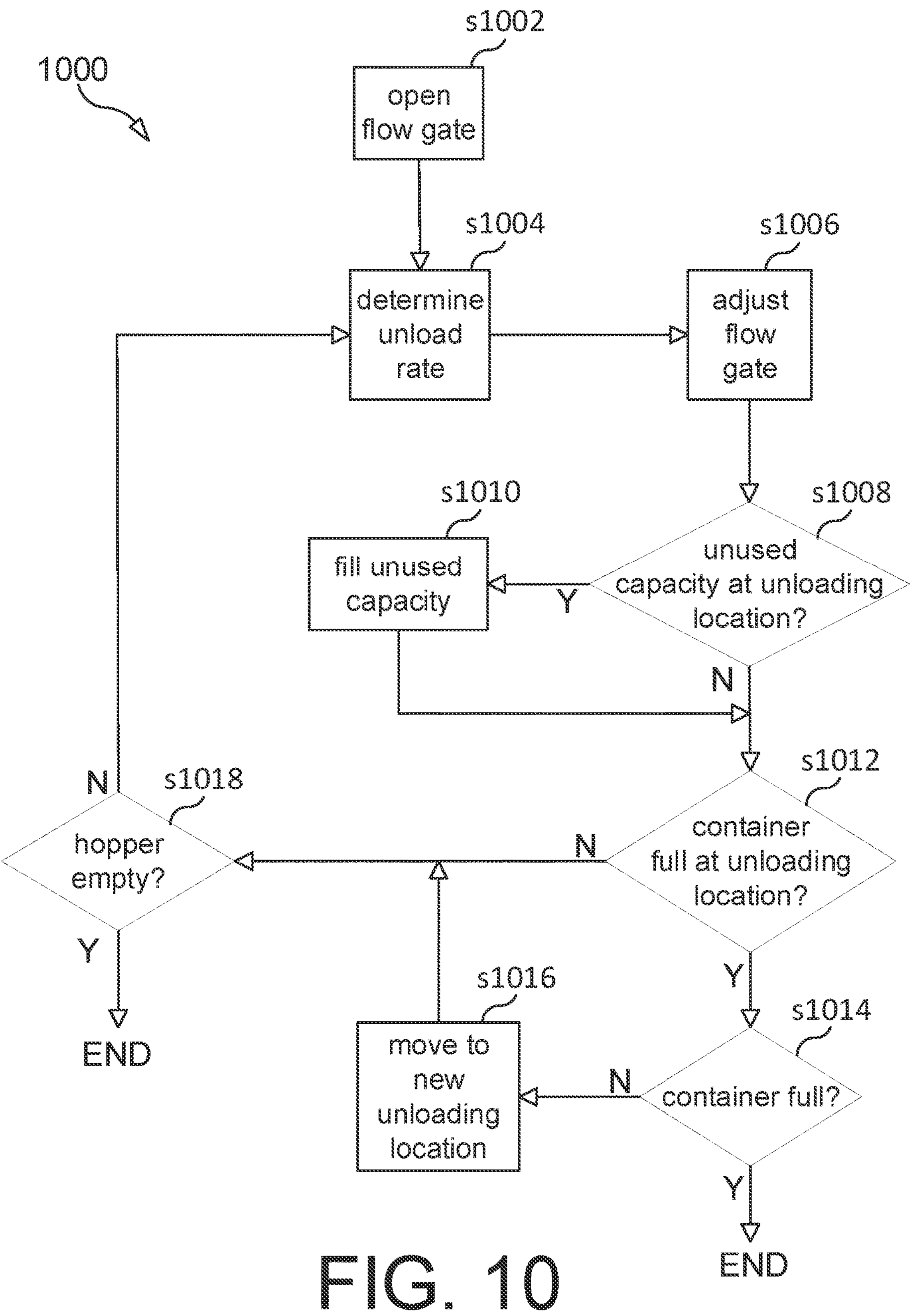
FIG. 10 is a flow chart illustrating a process of discharging grain to a container according to some aspects of the present invention.

In some embodiments, as shown in FIG. 8, the process 800 may include a step 822 in which the cart 100 (and/or the vehicle 200) discharges material from the hopper 118 of the cart 100 to the container 302. In some embodiments, discharging the material in step 822 may occur after the auger is engaged and rotating at the proper speed. FIG. 10 is a flow chart illustrating a process 1000 of discharging material according to some non-limiting embodiments of the invention. In some embodiments, one or more steps of the process 1000 may be performed during the step 822 of the process 800 of FIG. 8. In some embodiments, the cart 100 and/or vehicle 200 (e.g., the one or more computers 622 of the cart 100 and/or vehicle 200) may perform one or more steps of the process 1000.

In some embodiments, as shown in FIG. 10, the process 1000 may include a step 1002 in which the cart 100 (and/or the vehicle 200) uses the flow gate controller 630 to partially or completely open the flow gate/door that separates material at the bottom of the hopper 118 from the auger assembly 110. In some embodiments, opening the flow gate/door may allow material to flow from the hopper 118 into the intake 112 of the lower auger assembly portion 106 of the auger assembly 110. In some embodiments, the auger of the auger assembly 110 may move material from the intake 112 to the discharge portion 104 and then discharge the material into the container 302.

In some embodiments, as shown in FIG. 10, the process 1000 may include a step 1004 in which the cart 100 (and/or the vehicle 200) determines a rate at which material is being unloaded from the hopper 118 of the cart 100. In some embodiments, the cart 100 (and/or the vehicle 200) may use the one or more load sensors 602 and/or the one or more hopper cameras 604 to monitor the weight and/or height of material (e.g., grain) in the hopper 118. In some embodiments, the cart 100 (and/or the vehicle 200) may determine an unload rate by measuring weight and/or height of material in the hopper 118 as it changes over time. In some embodiments, the cart 100 (and/or the vehicle 200) may additionally or alternatively use the one or more material movement/flow sensors 636 in the spout of the discharge portion of the auger assembly 110 to determine the unload rate.

In some embodiments, as shown in FIG. 10, the process 1000 may include a step 1006 in which the cart 100 (and/or the vehicle 200) adjusts the flow rate (if necessary). In some embodiments, the cart 100 (and/or the vehicle 200) may adjust the flow rate if the determined flow rate does not match a target flow rate. In some embodiments, the cart 100 (and/or the vehicle 200) may use the determined unload rate to adjust positioning of the flow gate/door to obtain the target unload rate. In some embodiments, based on the determined unload rate, the cart 100 (and/or the vehicle 200) may use the flow gate controller 630 move the flow gate/door in the direction of the fully opened position to increase the flow rate or in the direction of the fully closed position to decrease the flow rate.

In some embodiments, as shown in FIG. 10, the process 1000 may include one or more steps (e.g., steps 1008 and/or 1012) in which the cart 100 (and/or the vehicle 200) monitors the way in which material is filling the container 302. In some embodiments, the cart 100 (and/or the vehicle 200) may use the one or more proximity sensors 618 to monitor the way in which material is filling the container 302. In some embodiments, the one or more proximity sensors 618 may use one or more of sonar, radar, laser scanning, and/or cameras with image recognition software to monitor the way in which material is filling the container 302.

In some embodiments, as shown in FIG. 10, the process 1000 may include a step 1008 in which the cart 100 (and/or the vehicle 200) identifies any unused container capacity at the current unloading location. In some embodiments, the unused container capacity at the current unloading location may be due to, for example and without limitation, one or more voids (e.g., empty spaces) in the container 302 at the current unloading location, such as a depression in or unevenness of the material in the container 302. In some embodiments, the cart 100 (and/or the vehicle 200) may use the one or more proximity sensors 618 to identify the unused container capacity. In some embodiments, the cart 100 (and/or the vehicle 200) may additionally or alternatively receive unused container capacity information from the container 302 and/or container vehicle 300 (e.g., using the one or more communication interfaces 606). In some embodiments, the container 302 and/or container vehicle 300 may include one or more load sensors and/or one or more container cameras, and the unused container capacity information may include raw information from the container's one or more load sensors and/or one or more container cameras and/or an identification of the location of any unused container capacity detected by the container 302 and/or container vehicle 300. In some embodiments, the cart 100 (and/or the vehicle 200) may receive the unused container capacity information directly from the container 302 and/or container vehicle 300 or indirectly from the container 302 and/or container vehicle 300 (e.g., the container 302 and/or container vehicle 300 may convey unused container capacity information to a remote device 600, and the cart 100 and/or vehicle 200 may receive the unused container capacity information from the remote device 600). In some embodiments, if the cart 100 (and/or the vehicle 200) determines in step 1008 that unused container capacity in the material in the container 302 exists, the process 1000 may proceed to a step 1010. Otherwise, if the cart 100 (and/or the vehicle 200) determines in step 1008 that no unused container capacity exists, the process 1000 may proceed from step 1008 to a step 1012.

In some embodiments, as shown in FIG. 10, the process 1000 may include a step 1010 in which the cart 100 (and/or the vehicle 200) fills (or attempts to fill) any unused container capacity at the current unloading location that was identified in step 1008. In some embodiments, in step 1010, the cart 100 (and/or the vehicle 200) may use the spout controller 626 to control movement (e.g., rotation and/or tipping) of the spout of the discharge portion 104 of the auger assembly 110 to help fill any identified unused container capacity at the current unloading location with material. In some embodiments, the one or more spout sensors 628 may determine a position of the spout of the discharge portion 104 of the auger assembly 110, and the cart 100 (and/or the vehicle 200) may use the spout controller 626 to control movement of the spout based on the determined position of the spout and/or information from the one or more proximity sensors 618.

In some embodiments, the process 1000 may include a step 1012 in which the cart 100 (and/or the vehicle 200) determines whether the material has reached a full level in the container 302 at the location where the cart 100 is unloading the material. In some embodiments, if the cart 100 (and/or the vehicle 200) determines that the material has reached a full level at the container location where material is being unloaded, the process 1000 may proceed to a step 1014. Otherwise, the process 1000 may proceed from step 1012 to a step 1018.

In some embodiments, as shown in FIG. 10, the process 1000 may include a step 1014 in which the cart 100 (and/or the vehicle 200) determines whether the container 302 is full. In some embodiments, in step 1014, the cart 100 (and/or the vehicle 200) may use the one or more proximity sensors 618 to determine whether the container 302 is full. In some alternative embodiments, in step 1014, the cart 100 (and/or the vehicle 200) may additionally or alternatively use a difference between (a) the amount of material in the hopper 118 at the start of material discharging into the container 302 and (b) the current amount of material in the hopper 118 (as determined by the one or more load sensors 602, the one or more hopper cameras 604, and/or the one or more flow sensors 636) to calculate the amount of material unloaded. In some embodiments, the cart 100 (and/or the vehicle 200) may determine that the container 302 is full when the calculated amount of unloaded material is equal to the remaining capacity of the container 302 at the start of material discharge (e.g., using container capacity information received in step 810 or 816). In some embodiments, if the container 302 is determined to be not full in step 1014, the discharging material process 1000 may proceed to a step 1016. In some embodiments, if the container 302 is determined to be full in step 1014, the discharging process 1000 (and/or the discharging material step 822) may end.

In some embodiments, as shown in FIG. 10, the process 1000 may include a step 1016 in which the cart 100 (and/or the vehicle 200) moves to a new unloading location so that the cart 100 directs material into a new location of the container 302. In some embodiments, in step 1016, the cart 100 (and/or the vehicle 200) may use the vehicle controller 614 to control the one or more vehicle components 634 to move (e.g., move forward) to the new unloading location. In some embodiments, moving the cart 100 to direct material into a new location of the container 302 may prevent material from over-flowing the container 302. In some embodiments, the cart 100 (and/or the vehicle 200) may perform obstacle detection (e.g., using the one or more proximity sensors 618) so that the cart 100 (including the auger assembly 110 in the operating position) and vehicle 200 do not collide with container 302, any container vehicle 300, or any other obstacles while moving to the new unloading location. In some embodiments, the process 1000 may proceed from the step 1016 to a step 1018.

In some embodiments, as shown in FIG. 10, the process 1000 may include a step 1018 in which the cart 100 (and/or the vehicle 200) determines whether the hopper 118 of the cart 100 is empty. In some embodiments, in step 1018, the cart 100 (and/or the vehicle 200) may use the one or more load sensors 602, the one or more hopper cameras 604, and/or the one or more flow sensors 636 to determine whether the hopper 118 of the cart 100 is empty. In some embodiments, the cart 100 (and/or the vehicle 200) may determine that the hopper 118 is empty if the amount of material remaining in the hopper 118 is less than or equal to an empty threshold. In some embodiments, the empty threshold may be a non-zero amount (e.g., a non-zero weight, a non-zero volume, or a non-zero height). In some embodiments, if the cart 100 (and/or the vehicle 200) neither determine that the container 302 is full nor that the hopper 118 of the cart 100 is empty, the process 1000 may proceed from steps 1016 and 1018 back to step 1004. In some embodiments, if the cart 100 (and/or the vehicle 200) determines that the hopper 118 of the cart 100 is empty, the discharge process 1000 (and/or the discharging material step 822) may end.

In some embodiments, the cart 100, vehicle 200, discharge process 1000, and/or material discharging step 822 of the process 800 may include one or more features to facilitate even distribution of material in a container as described in U.S. Pat. No. 9,272,853, which is incorporated herein by reference in its entirety.

Returning to FIG. 8, when the material discharging step 822 ends, the process 800 may proceed to a step 824 in which the cart 100 (and/or vehicle 200) shuts down the auger of the auger assembly 110. In some embodiments, shutting down the auger may include the cart 100 (and/or the vehicle 200) using the flow gate controller 630 to partially or completely close the flow gate/door that separates material at the bottom of the hopper 118 from the intake 112 of the auger assembly 110. In some embodiments, shutting down the auger may include the cart 100 (and/or the vehicle 200) setting a speed of the prime mover and/or engine of the vehicle 200 at a safe disengagement speed. In some embodiments, the safe disengagement speed may be a speed at which no damage to auger drive 610 would occur when the auger is stopped. In some embodiments, setting the speed of the prime mover and/or the engine of the vehicle 200 at the safe disengagement speed may include decreasing the speed of the prime mover and/or the engine to the safe disengagement speed. In some embodiments, shutting down the auger may include disengaging the auger drive 610 so that the auger of the auger assembly 110 no longer receives power (e.g., via a power takeoff, a prime mover, and/or an engine of the vehicle 200).

In some embodiments, the cart 100 (and/or the vehicle 200) may use the one or more rotation sensors 620 to determine the rotational speed of the auger of the auger assembly 110, and the cart 100 (and/or the vehicle 200) may use the determined rotational speed of the auger to confirm that the auger stops rotating.

Figure 11:
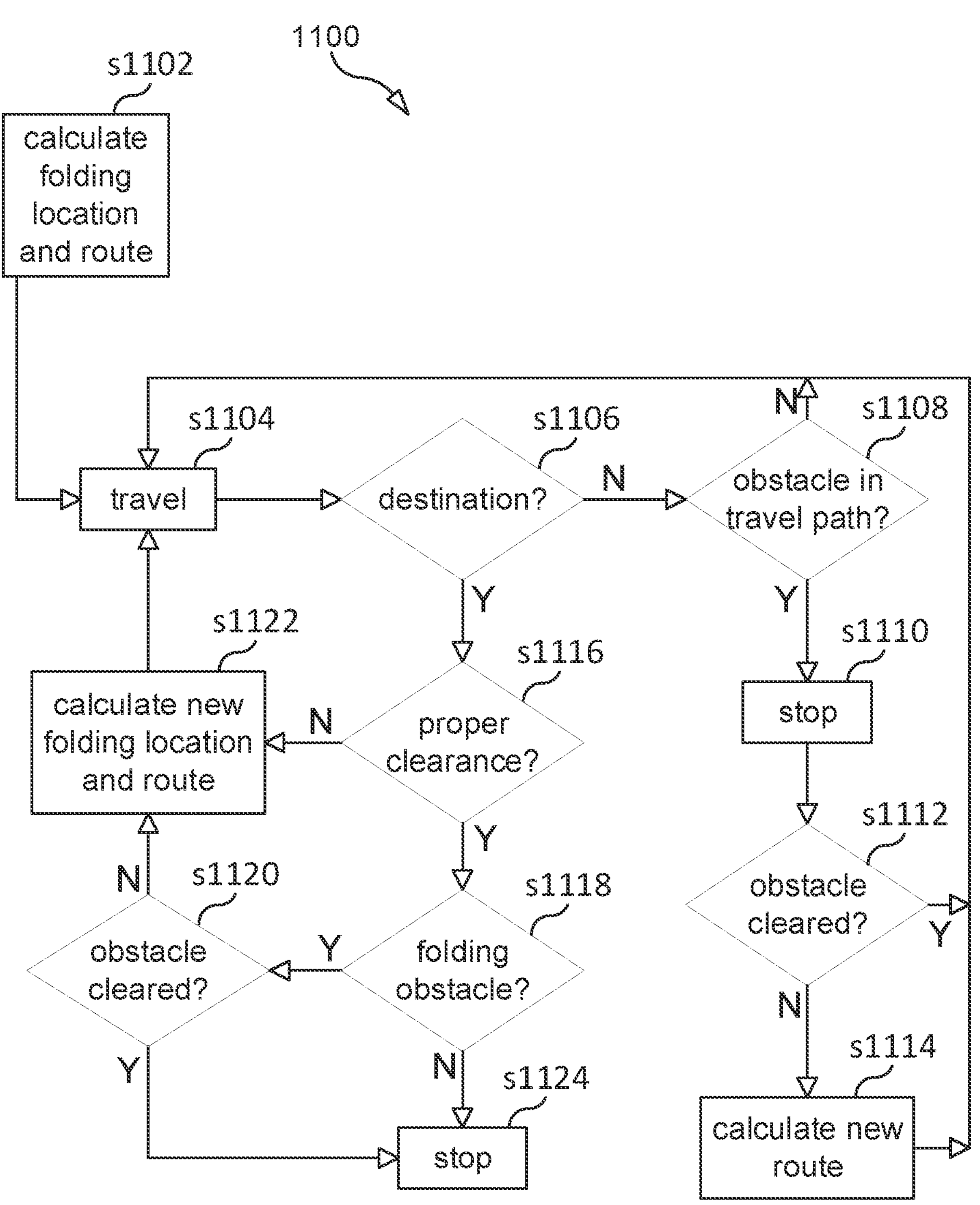
FIG. 11 is a flow chart illustrating a process of traveling to a location at which an auger of a cart can be safely returned from an operating position to a storage position according to some aspects of the present invention.

In some embodiments, as shown in FIG. 8, the process 800 may include a step 826 in which the vehicle 200 and/or the cart 100 moves to an auger folding location. In some embodiments, the auger folding location may be a location at which the cart 100 (and/or the vehicle 200) is able to safely fold the auger assembly 110 from the operating position to the storage position. FIG. 11 is a flow chart illustrating a process 1100 of traveling to an auger folding location according to some non-limiting embodiments of the invention. In some embodiments, one or more steps of the process 1100 may be performed during the step 826 of the process 800 of FIG. 8. In some embodiments, the cart 100 and/or vehicle 200 (e.g., the one or more computers 622 of the cart 100 and/or vehicle 200) may perform one or more steps of the process 1100.

In some embodiments, as shown in FIG. 11, the process 1100 may include a step 1102 in which the cart 100 (and/or the vehicle 200) determines an auger folding location and calculates a route to the determined auger folding location. In some embodiments, the cart 100 (and/or the vehicle 200) may use the location and/or navigation system 616 to determine the auger folding location and/or calculate the route to the determined auger folding location. In some embodiments, the determined auger folding location may be the location at which the auger assembly 110 was unfolded in 814. However, this is not required, and, in some alternative embodiments, the determined auger folding location may be a different location. In some embodiments, the location and/or navigation system 616 may calculate the route using one or more of field maps and/or harvest data. In some embodiments, the location and/or navigation system 616 may additionally or alternatively calculate the route using information from the one or more proximity sensors 618. For example, the location and/or navigation system 616 may calculate a route that avoids any obstacles detected using the one or more proximity sensors 618 (e.g., to avoid any detected obstacles that are not included in the permanent obstacles of the field maps).

In some embodiments, as shown in FIG. 11, the process 1100 may include a step 1104 in which the vehicle 200 and/or the cart 100 may travel to the determined auger folding location. In some embodiments, the vehicle 200 and/or the cart 100 may travel to the determined auger folding location using the route determined in step 1102. In some embodiments, in step 1104, the vehicle 200 and/or the cart 100 may travel by using the vehicle controller 614 to control one or more of the one or more vehicle components 634 of the cart 100 and/or vehicle 200 (e.g., the steering component). In some embodiments, while traveling, the vehicle 200 and/or the cart 100 may use the one or more speed sensors 632 to monitor the speed of the vehicle 200 and cause the vehicle controller 614 to prevent the vehicle from exceeding a maximum speed. In some embodiments, while traveling, the vehicle 200 and/or the cart 100 may use the location and/or navigation system 616 to determine the current position of the vehicle 200 and/or the cart 100 and, based on the current position, cause the vehicle controller 614 to control the vehicle components 634 to proceed on the determined route (e.g., the location and/or navigation system 616 may provide GPS guidance for the cart 100 and/or vehicle 200 to stay on the determine route). In some embodiments, the determined route may, to the extent possible, stay at least a threshold distance from an outer field boundary, which may have a higher possibility of obstacles (e.g., trees, tree branches, transmission lines, buildings, or other structures) that could collide with the auger assembly portion 102 in the operating position.

In some embodiments, as shown in FIG. 11, the process 1100 may include a step 1106 in which the cart 100 (and/or the vehicle 200) determines whether cart 100 (and/or the vehicle 200) has reached its destination at the determined auger folding location. In some embodiments, the step 1106 may be performed while the vehicle 200 and/or cart 100 are traveling. In some embodiments, the cart 100 (and/or the vehicle 200) may determine whether it is at the determined auger folding location using the location and/or navigation system 616 (e.g., by comparing the GPS location of the cart 100 and/or the vehicle 200 to the GPS location of the determined auger folding location) and/or the one or more proximity sensors 618. In some embodiments, if the cart 100 (and/or the vehicle 200) determines in step 1106 that the cart 100 (and/or the vehicle 200) has reached its destination at the determined auger folding location, the process 1100 may proceed to a step 1116. Otherwise, if the cart 100 (and/or the vehicle 200) determines in step 1106 that the cart 100 (and/or the vehicle 200) has not reached its destination at the determined auger folding location, the process 1100 may continue traveling and proceed to a step 1108.

In some embodiments, as shown in FIG. 11, the process 1100 may include a step 1108 in which the cart 100 (and/or the vehicle 200) determines whether any obstacles exist in the travel path of the vehicle 200 and/or cart 100. In some embodiments, the step 1108 may be performed while the vehicle 200 and/or cart 100 are traveling. In some embodiments, the vehicle 200 and/or the cart 100 may use the one or more proximity sensors 618 to detect any obstacles (e.g., a vehicle, a human or other animal, a hole, a tree, or a rock) that may be in the travel path of the vehicle 200 and/or cart 100. In some embodiments, the one or more proximity sensors 618 may use one or more of radar, sonar, laser scanning, cameras with image recognition technology, and/or GPS data to detect obstacles. In some embodiments, if the cart 100 (and/or the vehicle 200) determines that one or more obstacles exist in the travel path of the vehicle 200 and/or cart 100, the process 1100 may proceed to a step 1110. Otherwise, if the cart 100 (and/or the vehicle 200) determines that no obstacles exist in the travel path of the vehicle 200 and/or cart 100, the process 1100 may proceed to the step 1104, and the vehicle 200 and/or cart 100 may continue traveling to the determined auger folding location.

In some embodiments, as shown in FIG. 11, the process 1100 may include a step 1110 in which the cart 100 (and/or the vehicle 200) stops travel to avoid collision of the vehicle 200 and/or the cart 100 with the obstacle. In some embodiments, in step 1110, the vehicle 200 and/or the cart 100 may cause the vehicle controller 614 to control one or more of the vehicle components 634 (e.g., the braking component and/or steering component) to avoid collision of the vehicle 200 and/or the cart 100 with the obstacle. In some embodiments, if an obstacle is detected in step 1108, the vehicle 200 and/or the cart 100 may come to a full stop before colliding with the obstacle.

In some embodiments, as shown in FIG. 11, the process 1100 may include a step 1112 in which the cart 100 (and/or the vehicle 200) determines whether the detected obstacle has cleared. In some embodiments, in step 1112, the vehicle 200 and/or the cart 100 may use the one or more proximity sensors 618 to determine if the detected obstacle has cleared. In some embodiments, if the obstacle has cleared, the process 1100 may proceed back to step 1104, and the vehicle 200 and/or the cart 100 may continue on the determined route. In some embodiments, if the obstacle has not cleared after a threshold amount of time, the process 1100 may proceed to a step 1114.

In some embodiments, as shown in FIG. 11, the process 1100 may include a step 1114 in which the cart 100 (and/or the vehicle 200) calculates a new route that avoids the obstacle. In some embodiments, the cart 100 (and/or vehicle 200) may calculate the new route using the location and/or navigation system 616. In some embodiments, the location and/or navigation system 616 may use one or more of field maps and/or harvest data. In some embodiments, the cart 100 (and/or the vehicle 200) may calculate a new route for travel from the current location of the cart 100 to the determined auger folding location. In some alternative embodiments, the cart 100 (and/or the vehicle 200) may determine a new auger folding location and calculate a new route for travel from the current location of the cart 100 to the newly determined auger folding location. In some further alternative embodiments, the cart 100 (and/or the vehicle 200) may (i) calculate a new route to the determined auger folding location, (ii) determine a new auger folding location and calculate a route to the newly determined auger folding location, and (iii) select one of the routes. In some embodiments, the cart 100 (and/or the vehicle 200) may select one of the routes by comparing the routes and selecting a route based on one or more criteria (e.g., which route is shorter, quicker, uses less fuel, and/or causes the least soil compaction). In some embodiments, after a new route is calculated, the process 1100 may proceed back to step 1104, and the vehicle 200 and/or the cart 100 may begin traveling to an auger folding location using the newly calculated route.

In some embodiments, as shown in FIG. 11, the process 1100 may include a step 1116 in which the cart 100 (and/or the vehicle 200), after determining that the cart 100 (and/or the vehicle 200) has reached its destination at the auger folding location, may determine whether the cart 100 (and/or the vehicle 200) is far enough away from the container 302 for the cart 100 to be able to fold the auger assembly 110. In some embodiments, the cart 100 (and/or the vehicle 200) may determine whether the current location of the cart 100 allows proper clearance (relative to the container 302, any mobile container vehicle 300, and/or any other obstacles) for the auger assembly 110 to be moved (e.g., folded) from an operating position (e.g., as shown in FIGS. 1A-1E) to a storage position (e.g., as shown in FIGS. 2A-2E). In some embodiments, if the cart 100 (and/or the vehicle 200) determines that there is not proper clearance, the process 1100 may proceed to a step 1122. Otherwise, the process 1100 may proceed from the step 1116 to a step 1118.

In some embodiments, as shown in FIG. 11, the process 1100 may include a step 1118 in which the cart 100 (and/or the vehicle 200) determines whether there are any obstacles that might interfere with movement of the auger assembly 110 from its operating position to a storage position. In some embodiments, in step 1118, the vehicle 200 and/or the cart 100 may use the one or more proximity sensors 618 to detect any obstacles that might interfere with movement of the auger assembly 110 from its operating position to the storage position. In some embodiments, if the cart 100 (and/or the vehicle 200) determines in step 1118 that there are no obstacles to movement of the auger assembly 110 to the storage position, the process 1100 may proceed to a step 1124. Otherwise, if the cart 100 (and/or the vehicle 200) determines in step 1118 that one or more obstacles exist that might interfere with movement of the auger assembly 110 to the storage position, the process 1100 may proceed to a step 1120.

In some embodiments, as shown in FIG. 11, the process 1100 may include a step 1120 in which the cart 100 (and/or the vehicle 200) determines whether the auger folding obstacle has cleared. In some embodiments, the cart 100 (and/or the vehicle 200) may determine whether the auger folding obstacle has cleared using the one or more proximity sensors 618. In some embodiments, if the obstacle has cleared, the process 1100 may proceed to a step 1124. In some embodiments, if the obstacle has not cleared after a threshold amount of time, the process 1100 may proceed to a step 1122.

In some embodiments, as shown in FIG. 11, the process 1100 may include a step 1122 in which the cart 100 (and/or the vehicle 200) determines a new auger folding location and calculates a route to the newly determined auger folding location (e.g., in the same manner described above with respect to step 1102). In some embodiments, the process 1100 may proceed from step 1122 to step 1104 to travel to the new auger folding location.

In some embodiments, as shown in FIG. 11, the process 1100 may include a step 1124 in which the cart 100 (and/or the vehicle 200) brings the vehicle 200 and/or cart 100 to a full stop (e.g., by causing the vehicle controller 614 to control a braking component of the one or more of the vehicle components 634). In some embodiments, bringing the vehicle 200 and/or cart 100 to a full stop may include using the one or more speed sensors 632 to confirm that the vehicle 200 and/or cart 100 have stopped.

Returning to FIG. 8, in some embodiments, the process 800 may include a step 828 in which the cart 100 (and/or vehicle 200), after reaching a location near the container 302 that has proper clearance and is free of obstacles to moving the auger to a storage position, moves (e.g., folds) the auger assembly 110 from its operating position to a storage position. In some embodiments, the location for moving the auger assembly 110 to the storage position in step 828 may be the same location used for moving the auger assembly 110 to the operating position in step 814. However, this is not required, and, in some alternative embodiments, a different location may be used. In some embodiments, in step 828, the cart 100 (and/or vehicle 200) may move the auger assembly 110 to the storage position using the auger positioner 612. In some embodiments, the step 828 may include the cart 100 (and/or vehicle 200) using the one or more auger sensors 608 and/or the one or more proximity sensors 618 to determine the position of the upper auger assembly portion 102 of the auger assembly 110 as it moves from the operating position to the storage position. In some embodiments, the cart 100 (and/or vehicle 200) may disengage the auger positioner 612 after the auger assembly portion 102 reaches the storage position.

In some embodiments, while moving the upper auger assembly portion 102 in step 828, the cart 100 (and/or vehicle 200) may perform obstacle detection (e.g., using the radar, sonar, laser scanning, and/or cameras with image recognition technology of the one or more proximity sensors 618) to prevent the upper auger assembly portion 102 from colliding with any obstacles in the folding path. In some embodiments, if an obstacle is detected while moving the upper auger assembly portion 102 of the auger assembly 110 to its storage position in step 828, the cart 100 (and/or vehicle 200) may use the auger positioner 612 to stop movement of the upper auger assembly portion 102 before collision. In some embodiments, if an obstacle is detected, the cart 100 (and/or vehicle 200) may use the auger positioner 612 to return the upper auger assembly portion 102 to its operating position. In some embodiments, the cart 100 (and/or vehicle 200) may perform obstacle detection while returning the upper auger assembly portion 102 to its operating position. In some embodiments, if an obstacle is detected, the cart 100 (and/or vehicle 200) may determine whether the obstacle has been removed (e.g., within a certain amount of time). If the obstacle is determined to have been removed, the cart 100 (and/or vehicle 200) may try again to move the upper auger assembly portion 102 of the auger assembly 110 to its storage position. If the obstacle is still present, the cart 100 (and/or vehicle 200) may move to a new location for folding the auger assembly 110 (e.g., by proceeding back to step 826 of the process 800 of FIG. 8 and/or to step 1122 of the process 1100 of FIG. 11).

In some embodiments, if an obstacle to moving the auger assembly 110 to its storage position is detected in step 828, the cart 100 (and/or vehicle 200) may notify a combine harvester 400, and/or a remote manager, of the obstacle (e.g., by using the one or more communication interfaces 606 to convey a message to the combine harvester 400 and/or a remote device 600). In some embodiments, the cart 100 (and/or vehicle 200) may request instructions or guidance for proceeding from the combine harvester 400 and/or remote manager and may proceed according to any instructions or guidance received.

In some embodiments, the step 828 may include the cart 100 (and/or vehicle 200) confirming that the auger assembly 110 is in the storage position before proceeding from step 828. In some embodiments, the cart 100 (and/or vehicle 200) may use the one or more auger sensors 608, the one or more proximity sensors 618, and/or one or more sensors in the fold/linkage mechanism to determine whether the upper auger assembly portion 102 of the auger assembly 110 is in the storage position. In some embodiments, the cart 100 (and/or vehicle 200) may obtain confirmation about the position of the auger assembly 110 before moving because having the auger assembly 110 out could result in a collision of the auger assembly 110 with the auger or conveyor of the combine harvester 400 or other obstacles in the field (e.g., trees, power lines, etc.).

In some embodiments, if the cart 100 (and/or the vehicle 200) determined (e.g., in step 822) that the container 302 was full (or that a predetermined amount of material was discharged into the container 302) and stopped discharging material before the hopper 118 of the cart 100 was empty, the process 800 may proceed from step 828 to a step 836 in which a route to a new container 302 (if available) is determined. In some embodiments, if the cart 100 (and/or the vehicle 200) determined (e.g., in step 822) that the hopper 118 of the cart 100 was empty, the process 800 may proceed from step 828 to a step 830 in which a route to a combine harvester 400 is determined.

In some embodiments, as shown in FIG. 8, the process 800 may include a step 830 in which the cart 100 (and/or vehicle 200) calculates a route to a combine harvester 400.

In some embodiments, the cart 100 (and/or vehicle 200) calculates a route to the combine harvester 400 that was the last to offload material to the cart 100 (e.g., in step 804) or to a different combine harvester. In some embodiments, the cart 100 (and/or vehicle 200) may calculate a route to a combine harvester 400 to which the cart 100 (and/or vehicle 200) is assigned. In some embodiments, a combine harvester 400 and/or a remote device 600 may assign one or more carts 100 to a particular harvester 400 (e.g., to avoid more carts than necessary going to the same combine harvester 400). In some embodiments, a combine harvester 400 may convey a request for one or more carts 100 (e.g., including an order of preference) to a remote device 600, and the remote device 600 may assign an available cart 100 of the one or more requested carts to the combine harvester 400.

In some embodiments, in step 830, the cart 100 (and/or the vehicle 200) may receive the location (e.g., GPS location) of a combine harvester 400 (e.g., using the one or more communication interfaces 606). In some embodiments, the one or more communication interfaces 606 of the cart 100 and/or the vehicle 200 may receive the harvester location directly from the combine harvester 400 and/or indirectly from the combine harvester 400 (e.g., using one or more relays). In some embodiments, the one or more communication interfaces 606 of the cart 100 and/or the vehicle 200 may additionally or alternatively receive the harvester location from one or more remote devices 600 (e.g., a cloud server) to which the combine harvester 400 has uploaded its location (e.g., using radio signals and/or cellular signals). In some embodiments, the cart 100 (and/or vehicle 200) may use the location and/or navigation system 616 to calculate a route to the received location of the combine harvester 400. In some embodiments, the location and/or navigation system 616 may use one or more of field maps and/or harvest data to calculate the route. In some embodiments, as harvesting that will take place in the near future may open up a better route, the route calculations may consider unharvested areas that are predicted to be harvested by the time the cart 100 and/or vehicle 200 would arrive.

In some embodiments, in step 830, the cart 100 (and/or the vehicle 200) may receive additional harvester information about the combine harvester 400. In some embodiments, the additional harvester information may include, for example and without limitation, a harvester identification, direction information indicating the direction in which the combine harvester 400 is traveling, speed information indicating the speed at which the combine harvester 400 is traveling, and/or route information indicating a planned route on which the combine harvester 400 is traveling. In some embodiments, the cart 100 (and/or the vehicle 200) may use the received location of the combine harvester 400 and the additional harvester information to calculate a predicted meeting location. In some embodiments, the predicted meeting location may be a location on the combine harvester 400's planned route at which the cart 100 can meet the combine harvester 400. In some embodiments, calculating the predicted meeting location may consider whether the hopper of the combine harvester 400 has or is predicted to run out of capacity, which would require the combine harvester 400 to stop moving until offloading begins. In some embodiments, the cart 100 (and/or the vehicle 200) may use the location and/or navigation system 616 to calculate a route to the predicted meeting location (instead of to the received location of the combine harvester 400). In some embodiments, the location and/or navigation system 616 may use one or more of field maps and/or harvest data to calculate the route to the predicted meeting location.

In some embodiments, in step 830, the cart 100 (and/or the vehicle 200) may receive the location (e.g., GPS location) of two or more combine harvesters 400 (e.g., using the one or more communication interfaces 606). In some embodiments, the one or more communication interfaces 606 of the cart 100 and/or the vehicle 200 may receive the two or more harvester locations directly and/or indirectly from the two or more combine harvesters 400, and/or the one or more communication interfaces 606 may receive the two or more harvester locations from a remote location (e.g., cloud server) to which the two or more combine harvesters 400 have uploaded their locations (e.g., using radio signals and/or cellular signals). In some embodiments, the cart 100 (and/or the vehicle 200) may also receive additional harvester information about the two or more combine harvesters 400. In some embodiments, the additional harvester information may include, for example and without limitation, a harvester identification, direction information indicating the direction in which the combine harvester 400 is traveling, speed information indicating the speed at which the combine harvester 400 is traveling, route information indicating a planned route on which the combine harvester 400 is traveling, material information indicating how much material (e.g., grain) the combine harvester 400 has to offload and/or how much remaining material capacity the combine harvester 400 has, and cart information indicating how many carts 100 are servicing (e.g., receiving material from) and/or waiting to service the combine harvester 400.

In some embodiments, the cart 100 (and/or vehicle 200) may select one of the two or more combine harvesters as the destination harvester. In some embodiments, the cart 100 (and/or vehicle 200) may select the combine harvester 400 that was the last to offload material to the cart 100 (e.g., in step 804) as the destination harvester. In some embodiments, the cart 100 (and/or vehicle 200) may select the destination combine harvester using one or more selection criteria. In some embodiments, the one or more selection criteria may consider one or more of: (i) how far the combine harvesters 400 are from the cart 100 or vehicle 200, (ii) how long (distance or time wise) the routes from the location of the cart 100 or vehicle 200 to the received locations or predicted meeting locations are, (iii) how many carts 100 are already servicing the combine harvester 400, (iv) how close the combine harvesters 400 are to reaching material capacity, (v) how far the combine harvesters 400 are from other carts 100 having material capacity, and/or (vi) how long (distance or time wise) the routes from the locations of other carts 100 having material capacity to current harvester locations or predicted meeting locations are. In some embodiments, the cart 100 (and/or vehicle 200) may select the combine harvester 400 having the shortest or fastest route, having the fewest carts 100 servicing or waiting to service it, and/or that is closest to reaching material capacity. In some embodiments, the harvester selection may be made based on selection preferences of an operator or manager. In some embodiments, the one or more remote devices 600 or a combine harvester 400 may select the combine harvester 400 that will load material into the cart 100 (instead of the cart 100 and/or vehicle 200 making the selection) and convey an identification of the selected combine harvester 400 to the cart 100 and/or vehicle 200 (e.g., in response to a request from the cart 100 and/or vehicle 200 for a harvester selection). In some embodiments, the remote device 600 or combine harvester 400 may similarly use one or more selection criteria, which may consider pertinent information (e.g., location and/or remaining capacity) related to one or more combine harvesters 400 and/or one or more carts 100. In some embodiments, the cart 100 (and/or the vehicle 200) may use the location and/or navigation system 616 to calculate a route to a received location of the selected combine harvester 400 or to a predicted meeting location of the cart 100 and the selected combine harvester 400 on the planned route of the selected combine harvester 400.

In some embodiments, all carts 100 (and/or vehicles 200) in a harvesting area or harvesting project may communicate or share planned travel routes with other, and the calculated route may additionally or alternatively take into account the shared planned travel routes to collisions with other carts 100 and/or vehicles 200 while traveling to the selected combine harvester 400.

In some embodiments, as shown in FIG. 8, the process 800 may include a step 832 in which the cart 100 (and/or vehicle 200) travels to a combine harvester 400. In some embodiments, the cart 100 (and/or vehicle 200) may travel to a combine harvester 400 using the route calculated in step 830. In some embodiments, in step 832, the vehicle 200 and/or the cart 100 may travel by using the vehicle controller 614 to control one or more of the one or more vehicle components 634 of the cart 100 and/or vehicle 200 (e.g., the steering component). In some embodiments, while traveling, the vehicle 200 and/or the cart 100 may use the one or more speed sensors 632 to monitor the speed of the vehicle 200 and cause the vehicle controller 614 to prevent the vehicle from exceeding a maximum speed. In some embodiments, while traveling, the vehicle 200 and/or the cart 100 may use the location and/or navigation system 616 to determine the current position of the vehicle 200 and/or the cart 100 and, based on the current position, cause the vehicle controller 614 to control the vehicle components 634 to proceed on the determined route (e.g., the location and/or navigation system 616 may provide GPS guidance for the vehicle 200 to stay on the determined route).

In some embodiments, if the auger assembly portion 102 is in its operating position (as opposed to its storage position) while the cart 100 and/or the vehicle 200 is traveling in step 832 (e.g., because an operator of the cart 100 and/or the vehicle 200 has manually caused the auger assembly 110 to move to its operating position), the vehicle 200 and/or the cart 100 may use the location and/or navigation system 616 to avoid, to the extent possible, going within a threshold distance from an outer field boundary, which may have a higher possibility of obstacles (e.g., trees, tree branches, transmission lines, buildings, or other structures) that could collide with the auger assembly portion 102 in the operating position.

In some embodiments, in step 832, while the vehicle 200 and/or the cart 100 are traveling, the cart 100 (and/or the vehicle 200) may determine whether any obstacles exist in the travel path of the vehicle 200 and/or cart 100. In some embodiments, the vehicle 200 and/or the cart 100 may use the one or more proximity sensors 618 to detect any obstacles (e.g., a vehicle, a human or other animal, a hole, a tree, or a rock) that may be in the travel path of the vehicle 200 and/or cart 100. In some embodiments, the one or more proximity sensors 618 may use one or more of radar, sonar, laser scanning, cameras with image recognition technology, and/or GPS data to detect obstacles.

In some embodiments, if the cart 100 (and/or the vehicle 200) determines that one or more obstacles exist in the travel path of the vehicle 200 and/or cart 100, the cart 100 (and/or the vehicle 200) may stop travel to avoid collision of the vehicle 200 and/or the cart 100 with the obstacle (e.g., by causing the vehicle controller 614 to control one or more of the vehicle components 634 such as, for example and without limitation, the braking component and/or steering component). In some embodiments, the cart 100 (and/or the vehicle 200) may determine whether the detected obstacle has cleared (e.g., using the one or more proximity sensors 618). In some embodiments, if the obstacle has not cleared after a threshold amount of time, the cart 100 (and/or the vehicle 200) may calculate a new route that avoids the obstacle (e.g., using the location and/or navigation system 616, field maps, and/or harvest data).

In some embodiments, when the cart 100 and/or the vehicle 200 reach the combine harvester 400, the cart 100 and/or the vehicle 200 may, depending on the circumstances, not be able to immediately approach the combine harvester 400 and position the hopper 118 to receive material (e.g., grain) from the combine harvester 400. For example, if the combine harvester 400 is starting to harvest a field (or has just started harvesting the field), there may not be sufficient harvested areas of the field for the cart 100 and/or the vehicle 200 to approach the combine harvester 400 and position the hopper 118 to receive material from the combine harvester 400 without the cart 100 and/or the vehicle 200 traveling over and possibly damaging unharvested areas of the field. In some embodiments, if the cart 100 and/or the vehicle 200 is not immediately able to approach the combine harvester 400 and position the hopper 118 to receive material, the cart 100 and/or the vehicle 200 may hold a position at the edge of the field (e.g., by causing the vehicle controller 614 to control one or more of the vehicle components 634 such as, for example and without limitation, the braking component) until the cart 100 and/or the vehicle 200 is able to approach the combine harvester 400 and position the hopper 118 to receive material.

In some alternative embodiments, if the cart 100 and/or the vehicle 200 is not immediately able to approach the combine harvester 400 and position the hopper 118 to receive material, the cart 100 and/or the vehicle 200 may follow the combine harvester 400 on the newly harvested path of the combine harvester 400 as it cuts through the unharvested field. In some embodiments, while following the combine harvester 400, the cart 100 and/or the vehicle 200 may stay a set-back distance (e.g., a few hundred feet) away from the combine harvester 400 (e.g., to avoid colliding with the combine harvester 400 if the combine harvester 400 stops or slows down and/or to provide space if the combine harvester 400 needs to back up). In some embodiments, if the cart 100 and/or the vehicle 200 determines that the combine harvester 400 stops (e.g., using the one or more proximity sensors 618) while the cart 100 and/or the vehicle 200 is following the combine harvester 400, the cart 100 and/or the vehicle 200 may back up (e.g., by causing the vehicle controller 614 to control one or more of the vehicle components 634 such as, for example and without limitation, a transmission component, a steering component, and/or an acceleration component) to provide space for the combine harvester 400 in the event that the combine harvester 400 backs up.

In some embodiments, during the traveling of steps 812 and 832, the cart 100 (and/or vehicle 200) may determine whether the cart 100 and/or vehicle 200 is having difficulties (e.g., mechanical difficulties). In some embodiments, the mechanical difficulties determined may include, for example and without limitation, one or more of gearbox overheating, incorrect torque to unload, engine issues, axle driveline issues, transmission issues, and power takeoff RPMs. In some embodiments, if the cart 100 and/or vehicle 200 is determined to be having difficulties, the cart 100 and/or vehicle 200 may shut itself down and convey (e.g., upload)

a maintenance alert to the one or more remote devices 600 (e.g., a cloud server). In some embodiments, the maintenance alert may include a location of the cart 100 and/or vehicle 200 (e.g., as determined by the location and navigation system 616). In some embodiments, the one or more remote devices 600 may pass on the maintenance alert to the appropriate maintenance crew or individual, who may tow, repair, or otherwise service the cart 100 and/or vehicle 200. In some embodiments, the one or more remote devices 600 may pass on the location of any downed carts or vehicles, which may be received from other carts 100 and/or vehicles 200 and taken into consideration for route calculation purposes.

In some embodiments, as shown in FIG. 8, the process 800 may include a step 834 in which the cart 100 (and/or vehicle 200) initiates material offloading. In some embodiments, in step 834, the cart 100 (and/or vehicle 200) may initiate material offloading in the manner described above with respect to step 802. In some embodiments, the process 800 may proceed from step 834 to the step 804 in which the cart 100 receives material from the combine harvester 400.

In some embodiments, as shown in FIG. 8, the process 800 may include a step 836 in which the cart 100 (and/or vehicle 200) determines a route for travel to another container 302. In some embodiments, in step 836, the cart 100 (and/or vehicle 200) may calculate the travel route in the manner described above with respect to step 810. In some embodiments, the process 800 may proceed from the step 836 to the step 812 in which the vehicle 200 and/or cart 100 travel to the next container 302 to continue unloading the material from the hopper 118 of the cart 100. However, if no container 302 is available, the cart 100 (and/or vehicle 200) may wait until a container 302 becomes available before determining the route to the newly available container 302 and then proceeding to the step 812, or the cart 100 (and/or the vehicle 200) may proceed to the step 830 (and steps 832 and 834) to travel to and receive additional material from a combine harvester 400. In some embodiments, if no container 302 is available, the cart 100 (and/or the vehicle 200) may determine the amount of material remaining in the hopper 118 and/or the remaining capacity of the hopper 118 (e.g., using the one or more load sensors 602 and/or the one or more hopper cameras 604), and the cart 100 (and/or the vehicle 200) may determine whether to wait for the next available container 302 or travel to and receive additional material from a combine harvester 400 based on the determined amount of material remaining in the hopper 118 and/or the determined remaining capacity of the hopper 118. In some embodiments, determining whether to wait may include comparing the determined amount of material remaining in the hopper 118 to a wait amount threshold and/or comparing the determined remaining capacity of the hopper 118 to a wait capacity threshold. In some embodiments, the cart 100 (and/or the vehicle 200) may determine to wait for the next available container 302 if the determined amount of material remaining in the hopper 118 exceeds the wait amount threshold and/or if the determined remaining capacity of the hopper 118 is below the wait capacity threshold.

In some embodiments, one or more of the systems described above may be periodic systems updated on a periodic (e.g., yearly) basis. For example, in some embodiments, one or more of the field maps, harvest data, performance parameters, auger fold locations, outer field boundaries, container information, etc. may be checked and/or updated periodically.

Embodiments of the present invention have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention. For example, although in some embodiments the auger assembly 110 of the cart 100 may be a folding auger assembly capable of being moved between storage and operating positions, this is not required, and, in some alternative embodiments, the auger assembly 110 of the cart 100 may not be capable of folding and/or may always stay in an operating position.

What is claimed is:

1. A system comprising:

a cart, wherein the cart includes a hopper;

one or more load sensors, one or more hopper cameras, one or more gyro meters, one or more accelerometers, one or more steering angle sensors, and/or one or more suspension height position sensors; and one or more computers configured to:

use the one or more load sensors, the one or more hopper cameras, the one or more gyro meters, the one or more accelerometers, the one or more steering angle sensors, and/or the one or more suspension height position sensors to determine whether a load imbalance condition exists with respect to material in the hopper while the cart is receiving material from a moving combine harvester; and if the load imbalance condition is determined to exist, adjust a positioning of the hopper relative to a discharge end of an offloading conveyor of the combine harvester to correct the load imbalance by filling a different portion of the hopper with material from the combine harvester.

2. The system of claim 1, further comprising a vehicle controller and one or more vehicle components, wherein the one or more vehicle components comprise a power source, a steering component, a transmission component, a braking component, an acceleration component, a power takeoff, a prime mover, and/or an engine;

wherein the one or more computers are configured to, in adjusting the positioning of the hopper relative to the discharge end of the offloading conveyor of the combine harvester to correct the load imbalance, cause the vehicle controller to control one or more of the one or more vehicle components to move a position of the hopper relative to a position of the discharge end of the offloading conveyor of the combine harvester.

3. The system of claim 1, wherein the one or more computers are configured to, in adjusting the positioning of the hopper relative to the discharge end of the offloading conveyor of the combine harvester to correct the load imbalance, changing a lateral offset and/or longitudinal offset of the cart relative to the discharge end of the offloading conveyor of the combine harvester.

4. The system of claim 1, further comprising one or more communication interfaces, wherein the one or more computers are further configured to, if the load imbalance condition is determined to exist, use the one or more communication interfaces to convey a load imbalance indication to the combine harvester.

5. The system of claim 1, further comprising a vehicle controller and one or more vehicle components, wherein the one or more vehicle components comprise a power source, a steering component, a transmission component, a braking component, an acceleration component, a power takeoff, a prime mover, and/or an engine;

wherein the one or more computers are further configured to:

cause the vehicle controller to control one or more of the one or more vehicle components to maintain the cart at an offset position relative to the moving combine harvester, wherein the hopper of the cart is positioned below the discharge end of the offloading conveyor of the combine harvester at the offset position;

detect uneven ground and/or different elevations between the combine harvester and the cart;

use the detected uneven ground and/or different elevations to determine an adjusted offset position for the cart relative to the moving combine harvester; and causing the vehicle controller to control one or more of the one or more vehicle components to maintain the cart at the adjusted offset position relative to the combine harvester.

6. The system of claim 5, further comprising one or more gyro meters and/or one or more accelerometers, wherein the one or more computers are configured to:

use the one or more gyro meters and/or the one or more accelerometers to determine pitch and/or roll angles of the cart and/or a vehicle; and use the pitch and/or roll angles of the cart and/or the vehicle in detecting the uneven ground and/or different elevations between the combine harvester and the cart.

7. The system of claim 6, further comprising one or more communication interfaces, wherein:

the one or more computers are further configured to use the one or more communication interfaces to receive travel information from the combine harvester;

the travel information includes a roll angle and/or a pitch angle of the combine harvester; and the one or more computers are configured to use the roll angle and/or the pitch angle of the combine harvester in detecting the uneven ground and/or different elevations between the combine harvester and the cart.

8. A method performed by a system, the method comprising:

using one or more load sensors, one or more hopper cameras, one or more gyro meters, one or more accelerometers, one or more steering angle sensors, and/or one or more suspension height position sensors of a system to determine that a load imbalance condition exists with respect to material in a hopper of a cart of the system while the cart is receiving material from a moving combine harvester; and if the load imbalance condition is determined to exist, adjusting a positioning of the hopper relative to a discharge end of an offloading conveyor of the combine harvester to correct the load imbalance by filling a different portion of the hopper with material from the combine harvester.

9. The method of claim 8, wherein adjusting the positioning of the hopper relative to the discharge end of the offloading conveyor of the combine harvester to correct the load imbalance comprises causing a vehicle controller of the system to control one or more vehicle components to move a position of the hopper relative to a position of the discharge end of the offloading conveyor of the combine harvester.

10. The method of claim 8, wherein adjusting the positioning of the hopper relative to the discharge end of the offloading conveyor of the combine harvester to correct the load imbalance comprises changing a lateral offset and/or longitudinal offset of the cart relative to the discharge end of the offloading conveyor of the combine harvester.

11. The method of claim 8, further comprising, if the load imbalance condition is determined to exist, use one or more communication interfaces of the system to convey a load imbalance indication to the combine harvester.

12. The method of claim 8, further comprising causing a vehicle controller of the system to control one or more vehicle components of the system to maintain the cart at an offset position relative to the moving combine harvester, wherein the hopper of the cart is positioned below the discharge end of the offloading conveyor of the combine harvester at the offset position, and the one or more vehicle components comprise a power source, a steering component, a transmission component, a braking component, an acceleration component, a power takeoff, a prime mover, and/or an engine;

detecting uneven ground and/or different elevations between the combine harvester and the cart;

using the detected uneven ground and/or different elevations to determine an adjusted offset position for the cart relative to the moving combine harvester; and causing the vehicle controller to control the one or more vehicle components to maintain the cart at the adjusted offset position relative to the combine harvester.

13. The method of claim 12, further comprising:

using one or more gyro meters and/or one or more accelerometers of the system to determine pitch and/or roll angles of the cart and/or a vehicle; and using the pitch and/or roll angles of the cart and/or the vehicle in detecting the uneven ground and/or different elevations between the combine harvester and the cart.

14. The method of claim 12, further comprising:

using one or more communication interfaces of the system to receive travel information from the combine harvester, wherein the travel information includes a roll angle and/or a pitch angle of the combine harvester; and using the roll angle and/or the pitch angle of the combine harvester in detecting the uneven ground and/or different elevations between the combine harvester and the cart.

15. A system comprising:

a cart, wherein the cart includes a hopper;

a vehicle controller;

one or more vehicle components, wherein the one or more vehicle components comprise a power source, a steering component, a transmission component, a braking component, an acceleration component, a power takeoff, a prime mover, and/or an engine; and one or more computers configured to:

cause the vehicle controller to control one or more of the one or more vehicle components to maintain the cart at an offset position relative to a moving combine harvester, wherein the hopper of the cart is positioned below a discharge end of an offloading conveyor of the combine harvester at the offset position;

detect uneven ground and/or different elevations between the combine harvester and the cart;

use the detected uneven ground and/or different elevations to determine an adjusted offset position for the cart relative to the moving combine harvester; and causing the vehicle controller to control one or more of the one or more vehicle components to maintain the cart at the adjusted offset position relative to the combine harvester.

16. The system of claim 15, further comprising one or more gyro meters and/or one or more accelerometers, wherein the one or more computers are configured to:

use the one or more gyro meters and/or the one or more accelerometers to determine pitch and/or roll angles of the cart and/or a vehicle; and use the pitch and/or roll angles of the cart and/or the vehicle in detecting the uneven ground and/or different elevations between the combine harvester and the cart.

17. The system of claim 15, further comprising one or more communication interfaces, wherein:

the one or more computers are further configured to use the one or more communication interfaces to receive travel information from the combine harvester;

the travel information includes a roll angle and/or a pitch angle of the combine harvester; and the one or more computers are configured to use the roll angle and/or the pitch angle of the combine harvester in detecting the uneven ground and/or different elevations between the combine harvester and the cart.

18. The system of claim 15, further comprising one or more communication interfaces, wherein:

the one or more computers are further configured to use the one or more communication interfaces to receive information from the combine harvester;

the information received from the combine harvester includes a width of a header or platform of the combine harvester, a harvesting width of the combine harvester, and/or an indication of a difference between the harvesting width of the combine harvester and the width of the header or the platform of the combine harvester; and the one or more computers are further configured to use one or more of the width of the header or the platform, the harvesting width, and the difference between the harvesting width and the width of the header or the platform to determine the offset position relative to the combine harvester.

19. A method performed by a system, the method comprising:

causing a vehicle controller of the system to control one or more vehicle components of the system to maintain a cart of the system at an offset position relative to a moving combine harvester, wherein the hopper of the cart is positioned below a discharge end of an offloading conveyor of the combine harvester at the offset position, and the one or more vehicle components comprise a power source, a steering component, a transmission component, a braking component, an acceleration component, a power takeoff, a prime mover, and/or an engine;

detecting uneven ground and/or different elevations between the combine harvester and the cart;

using the detected uneven ground and/or different elevations to determine an adjusted offset position for the cart relative to the moving combine harvester; and causing the vehicle controller to control the one or more vehicle components to maintain the cart at the adjusted offset position relative to the combine harvester.

20. The method of claim 19, further comprising:

using one or more gyro meters and/or one or more accelerometers of the system to determine pitch and/or roll angles of the cart and/or a vehicle; and using the pitch and/or roll angles of the cart and/or the vehicle in detecting the uneven ground and/or different elevations between the combine harvester and the cart.

21. The method of claim 19, further comprising:

using one or more communication interfaces of the system to receive travel information from the combine harvester, wherein the travel information includes a roll angle and/or a pitch angle of the combine harvester; and using the roll angle and/or the pitch angle of the combine harvester in detecting the uneven ground and/or different elevations between the combine harvester and the cart.

22. The method of claim 19, further comprising:

using one or more communication interfaces of the system to receive information from the combine harvester, wherein the information received from the combine harvester includes a width of a header or platform of the combine harvester, a harvesting width of the combine harvester, and/or an indication of a difference between the harvesting width of the combine harvester and the width of the header or the platform of the combine harvester; and using one or more of the width of the header or the platform, the harvesting width, and the difference between the harvesting width and the width of the header or the platform to determine the offset position relative to the combine harvester.

* * * * *